US012588590B2

(12) United States Patent

Advani et al.

(10) Patent No.: US 12,588,590 B2

(45) Date of Patent: Mar. 31, 2026

(54) SYSTEMS AND METHODS FOR CROP STABILIZATION AND MEASUREMENT

(71) Applicant: DEERE & COMPANY, Moline, IL (US)

(72) Inventors: Gurmukh H. Advani, West Fargo, ND (US); Michael L. Rhodes, Richfield, MN (US); Kevin P. Cowles, Ankeny, IA (US); Noel W. Anderson, Fargo, ND (US); Ali Haidous, Johnston, IA (US); Andrew M. Schefter, Fargo, ND (US); Eric M. Johnson, Geneseo, IL (US)

(73) Assignee: Deere & Company, Moline, IL (US)

( * ) Notice: Subject to any disclaimer, the term of this patent is extended or adjusted under 35 U.S.C. 154(b) by 490 days.

(21) Appl. No.: 18/150,030

(22) Filed: Jan. 4, 2023

(65) Prior Publication Data

US 2024/0215483 A1     Jul. 4, 2024

(51) Int. Cl.
*A01D 41/127* (2006.01)
*A01D 41/14* (2006.01)

(52) U.S. Cl.
CPC ......... *A01D 41/127* (2013.01); *A01D 41/141* (2013.01)

(58) Field of Classification Search
CPC .............................. A01D 41/127; A01D 41/141
See application file for complete search history.

(56) References Cited

U.S. PATENT DOCUMENTS

| | | | |
|---|---|---|---|
| 2,584,180 A | 2/1952 | Aasland | |
| 2,587,857 A | 3/1952 | Karlsson | |
| 2,728,183 A | 12/1955 | Ratmeyer | |
| 2,949,674 A | 8/1960 | Wexler | |

(Continued)

FOREIGN PATENT DOCUMENTS

| | | |
|---|---|---|
| CA | 3115254 A1 | 4/2020 |
| DE | 2753149 A1 | 6/1979 |

(Continued)

OTHER PUBLICATIONS

Shape-memory polymer—Wikipedia, https://en.wikipedia.org/wiki/Shape-memory_polymer, Apr. 27, 2022 (13 pp.).

(Continued)

*Primary Examiner* — Brad Harcourt
(74) *Attorney, Agent, or Firm* — Taft Stettinius & Hollister LLP; Stephen F. Rost

(57) ABSTRACT

Stabilizers of an agricultural header can be either, or both, displaceable and deformable in response to engagement with a portion of a crop, such as, for example, a stalk, in a manner that can assist in stabilizing the crop for at least purposes of determining a corresponding cross-sectional size of the crop. Characteristics relating to the displacement or the deformation of the stabilizers can be detected by one or more sensors and communicated to a controller to determine a measured size of the crop. Using the measured size, the controller can determine if the size of the crop corresponds to a current size of a width between deck plates of the header. If the measured size indicates the width is to be adjusted, the controller can (Continued)

selectively operate an actuator that is coupled to at least one of the deck plates to displace at least one deck plate.

20 Claims, 23 Drawing Sheets

(56) References Cited

U.S. PATENT DOCUMENTS

| | | | |
|---|---|---|---|
| 3,339,354 A | 9/1967 | Kessler | |
| 3,808,783 A | 5/1974 | Sutherland et al. | |
| 3,839,887 A | 10/1974 | Vieregge | |
| 4,447,957 A | 5/1984 | Cavazza | |
| 4,517,795 A | 5/1985 | Meiers | |
| 4,528,804 A | 7/1985 | Williams | |
| 5,568,405 A | 10/1996 | Easton et al. | |
| 5,790,428 A | 8/1998 | Easton et al. | |
| 5,884,240 A | 3/1999 | Edgar et al. | |
| 6,584,390 B2 | 6/2003 | Beck | |
| 7,064,810 B2 | 6/2006 | Anderson et al. | |
| 7,206,063 B2 | 4/2007 | Anderson et al. | |
| 7,684,916 B2 | 3/2010 | Wei et al. | |
| 7,716,905 B2 | 5/2010 | Wilcox et al. | |
| 7,792,622 B2 | 9/2010 | Wei et al. | |
| 7,916,898 B2 | 3/2011 | Anderson | |
| 9,066,465 B2 | 6/2015 | Hendrickson et al. | |
| 9,232,693 B2 | 1/2016 | Hendrickson et al. | |
| 9,282,693 B2 | 3/2016 | Anderson | |
| 9,317,979 B2 | 4/2016 | Halmann | |
| 9,320,196 B2 | 4/2016 | Dybro et al. | |
| 9,322,629 B2 | 4/2016 | Sauder et al. | |
| 9,565,802 B2 | 2/2017 | Schleicher | |
| 9,578,808 B2 | 2/2017 | Dybro et al. | |
| 9,668,406 B2 | 6/2017 | Dybro | |
| 9,668,420 B2 | 6/2017 | Anderson et al. | |
| 9,693,503 B2 | 7/2017 | Dybro et al. | |
| 9,832,928 B2 | 12/2017 | Dybro et al. | |
| 9,894,835 B2 | 2/2018 | Sauder et al. | |
| 9,903,979 B2 | 2/2018 | Dybro et al. | |
| 9,936,637 B2 | 4/2018 | Anderson et al. | |
| 9,983,142 B2 | 5/2018 | Acheson et al. | |
| 10,034,424 B2 | 7/2018 | Anderson et al. | |
| 10,039,231 B2 | 8/2018 | Anderson et al. | |
| 10,051,787 B2 | 8/2018 | Todd et al. | |
| 10,126,282 B2 | 11/2018 | Anderson et al. | |
| 10,178,828 B2 | 1/2019 | Hendrickson et al. | |
| 10,188,037 B2 | 1/2019 | Bruns et al. | |
| 10,295,703 B2 | 5/2019 | Dybro et al. | |
| 10,371,558 B2 | 8/2019 | Tevs et al. | |
| 10,408,645 B2 | 9/2019 | Blank et al. | |
| 10,481,105 B2 | 11/2019 | Advani et al. | |
| 10,537,060 B2 | 1/2020 | Sauder et al. | |
| 10,645,917 B2 | 5/2020 | Anderson et al. | |
| 10,830,751 B2 | 11/2020 | Pickett et al. | |
| 10,832,351 B2 | 11/2020 | Blank et al. | |
| 10,993,373 B2 | 5/2021 | Meschke et al. | |
| 11,064,653 B2 | 7/2021 | Zielke et al. | |
| 11,240,959 B2 | 2/2022 | Borgstadt | |
| 2006/0096708 A1 | 5/2006 | Robinson | |
| 2014/0230392 A1 | 8/2014 | Dybro et al. | |
| 2014/0230396 A1 | 8/2014 | Dybro et al. | |
| 2014/0230580 A1 | 8/2014 | Dybro et al. | |
| 2015/0163992 A1 | 6/2015 | Anderson | |
| 2015/0319929 A1* | 11/2015 | Hendrickson | A01D 75/00 |
| | | | 33/504 |
| 2015/0327440 A1 | 11/2015 | Dybro et al. | |
| 2016/0235002 A1 | 8/2016 | Sauder et al. | |
| 2018/0017965 A1 | 1/2018 | Kosa et al. | |
| 2018/0116113 A1 | 5/2018 | Sauder et al. | |
| 2018/0122020 A1 | 5/2018 | Blank et al. | |
| 2019/0124826 A1 | 5/2019 | Pickett et al. | |
| 2020/0008351 A1 | 1/2020 | Zielke et al. | |
| 2020/0068803 A1 | 3/2020 | Sauder et al. | |
| 2020/0221635 A1 | 7/2020 | Hendrickson et al. | |
| 2020/0267899 A1 | 8/2020 | Zielke et al. | |
| 2021/0053229 A1 | 2/2021 | Yuan et al. | |
| 2021/0059114 A1 | 3/2021 | Eichhorn et al. | |
| 2021/0315160 A1 | 10/2021 | Zielke | |
| 2021/0318118 A1* | 10/2021 | Eichhorn | G01B 5/0035 |
| 2021/0329838 A1* | 10/2021 | Zielke | G01B 17/00 |
| 2022/0132737 A1 | 5/2022 | Anderson et al. | |
| 2022/0138925 A1 | 5/2022 | Anderson et al. | |
| 2022/0138987 A1 | 5/2022 | Anderson et al. | |
| 2022/0167547 A1* | 6/2022 | Vandike | A01B 79/005 |
| 2022/0232770 A1* | 7/2022 | Yanke | A01D 41/127 |
| 2024/0049638 A1* | 2/2024 | Fredricks | A01D 41/141 |

FOREIGN PATENT DOCUMENTS

| | | | |
|---|---|---|---|
| EP | 2517549 A1 | 10/2012 | |
| EP | 2859787 B1 | 10/2016 | |
| EP | 3772269 A1 | 2/2021 | |
| ES | 2358410 A1 | 5/2011 | |
| IN | 202031035536 A | 9/2020 | |

OTHER PUBLICATIONS

Broeski, Tom, Contour Gauge, The shape of things to come?, 2021 (6 pp.).

Drago GT Product Page, https://www.dragotec.com/products/drago-gt/overview/, Dragotec USA 2022, (26 pp.).

Memory foam—Wikipedia, https://en.wikipedia.org/wiki/Memory_foam, Apr. 27, 2022 (6 pp.).

Drago GT, World Innovation, OLimac Continuous Innovation, Oct. 10, 2017 (20 pp.).

Shi, Yeyin, et al., "Automatic corn plant location and spacing measurement using laser line-scan technique", Precision Agric, 2013, Sprinter Science+Business Media New York, DOI: 10.11007/s11119-013-9311-z, pp. 478-494 (17 pp.).

360 Yield Saver Installation Instructions, 360yieldcenter.com, Sep. 14, 2020 (4 pp.).

About Compliant Mechanisms, https://www.compliantmechanisms.byu.edu/about-compliant-mechanisms, Apr. 27, 2022 (8 pp.).

Kelly, Jonathan P., "By-plant Prediction of Com (Zea mays L.) Grain Yield Using Height and Stalk Diameter", Bachelor of Science in Plant and Soil Sciences, Oklahoma State University, May 2011 (49 pp.).

Compliant mechanism—Wikipedia, https://en.wikipedia.org/wiki/Compliant_mechanism, Apr. 27, 2022 (6 pp.).

Chandana R et al., "A Multipurpose Agricultural Robot for Automatic Ploughing, Seeding and Plant Health Monitoring", International Journal of Engineering Research & Technology (IJERT), ISSN: 2278-0181, IERE—2020 Conference Proceedings, Special Issue—2020 (4 pp.).

Biertresato, G. et al., "A Tracked Mobile Robotic Lab for Monitoring the Plants Volume and Health", Faculty of Science and Technology UniBZ—University of Bolzano 2016 (6 pp.).

Avinash N Bhat, et al., "Autonomous Robot with Microcontroller for Plant Health Condition Analysis", International Journal of Engineering Research & Technology (IJERT), ISSN: 2278-0181, vol. 10 Issue 06, Jun. 2021, Published by: http://www.ijert.org (6 pp.).

Megha Satras, et al., "Farming Robot With Plant Health Indication", 2019 JETIR Jun. 2019, vol. 6, Issue 6, www.jetir.org (ISSN-2349-5162) (9 pp.).

Prof. K.V. Fale, et al., "Autonomous Farming Robot With Plant Health Indication", International Journal of Advanced Technology in Engineering and Science, ISSN (online): 2348-7550, vol. No. 03, Issue No. 01, Jan. 2015, www.jates.com (4 pp.).

Dhanasekar J, et al., "Autonomous Farming Robot With Plant Health Indication", International Journal of Pure and Applied Mathematics, ISSN: 1311-8080, vol. 116, Issue No. 20, 2017, pp. 457-461, www.ijpam.eu (6 pp.).

Video: https://wyss.harvard.edu/media-post/3d-printing-soft-robots-with-embedded-sensors/.

Video: https://www.youtube.com/watch?v=bmvRqJB5wag; Jul. 2, 2020.

Shi, Yeyin, et al., "Corn Plant Location, Spacing and Stalk Diameter Measurements Using Optical Sensing Technologies" Submitted to

(56)         References Cited

OTHER PUBLICATIONS the Faculty of the Graduate College of the Oklahoma State University in partial fullment of the requirements for the Degree of Doctor of Philosophy, May 2014 (166 pp.).

* cited by examiner

1

SYSTEMS AND METHODS FOR CROP STABILIZATION AND MEASUREMENT

FIELD OF THE DISCLOSURE

The present disclosure relates to adjustment of components of a combine harvester and, more particularly, to systems and methods for stabilizing and measuring characteristics associated with crops in association with automatic adjustments of a width of an area at which movement of the measured crops is guided.

BACKGROUND

Agricultural machines, such as combine harvesters, include different portions or sections for cutting and processing crops. A corn header for a combine harvester is arranged to be moved in a forward direction over a field. The corn header includes a laterally extending frame supporting a separating mechanism to separate a crop, such as corn, from a stalk. The separating mechanism is configured to either cut the crop or to separate the crop from the stalk to collect the crop. The separated crop is collected and delivered to a collector, such as a grain cart, for delivery of the crop to a consumer.

A corn header includes a number of crop dividers, each crop divider defining a gap to direct stalks of corn to a row unit. The row unit can include a gathering chain, deck plates, and stalk rolls configured to separate corn ears from the stalk. The separated corn cars can be supported by the deck plates, which are separated by an adjustable gap. The corn cars are moved by the gathering chain to a floor of the header. An auger located above the floor moves the corn ears to a location for collection.

What is needed therefore is a crop header that mitigates reduced harvesting yields resulting from the gap being set too wide or too narrow for a field of crop.

SUMMARY

The present disclosure may include one or more of the following features and combinations thereof.

In one embodiment of the present disclosure, a system is provided for measuring a size of a crop. The system can include a first deck plate and a second deck plate as well as a first stabilizer that is adapted for at least one of a displacement and a deformation in response to an engagement of the first stabilizer with the crop. At least one first sensor can be adapted to generate a first sensor signal in response to a detection by the at least one first sensor of at least one of a displacement and a deformation of the first stabilizer. Additionally, a controller can be adapted to determine, using at least the first sensor signal, a measured size of the crop. Further, an actuator can be coupled to at least one of the first deck plate and the second deck plate. The controller can be adapted to selectively operate the actuator to adjust a width of a gap between the first and second deck plates to correspond to the measured size of the crop.

In another embodiment, a method is provided for measuring a size of a plant. The method can include detecting at least one of a displacement and a deformation of each of a first stabilizer and a second stabilizer from an engagement of the first and second stabilizers with the plant and, based on the detection of at least one of the displacement and the deformation, determine a measured size of the plant. Further, in response to the measured size of the plant, at least one of a first deck plate and a second deck plate can be displaced via operation of at least one actuator to adjust a width of a gap between the first and second deck plates.

These and other features of the present disclosure will become more apparent from the following description of the illustrative embodiments.

BRIEF DESCRIPTION OF THE DRAWINGS

The disclosure described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

Corresponding reference numerals are used to indicate corresponding parts throughout the several views.

DETAILED DESCRIPTION

Figure 1:
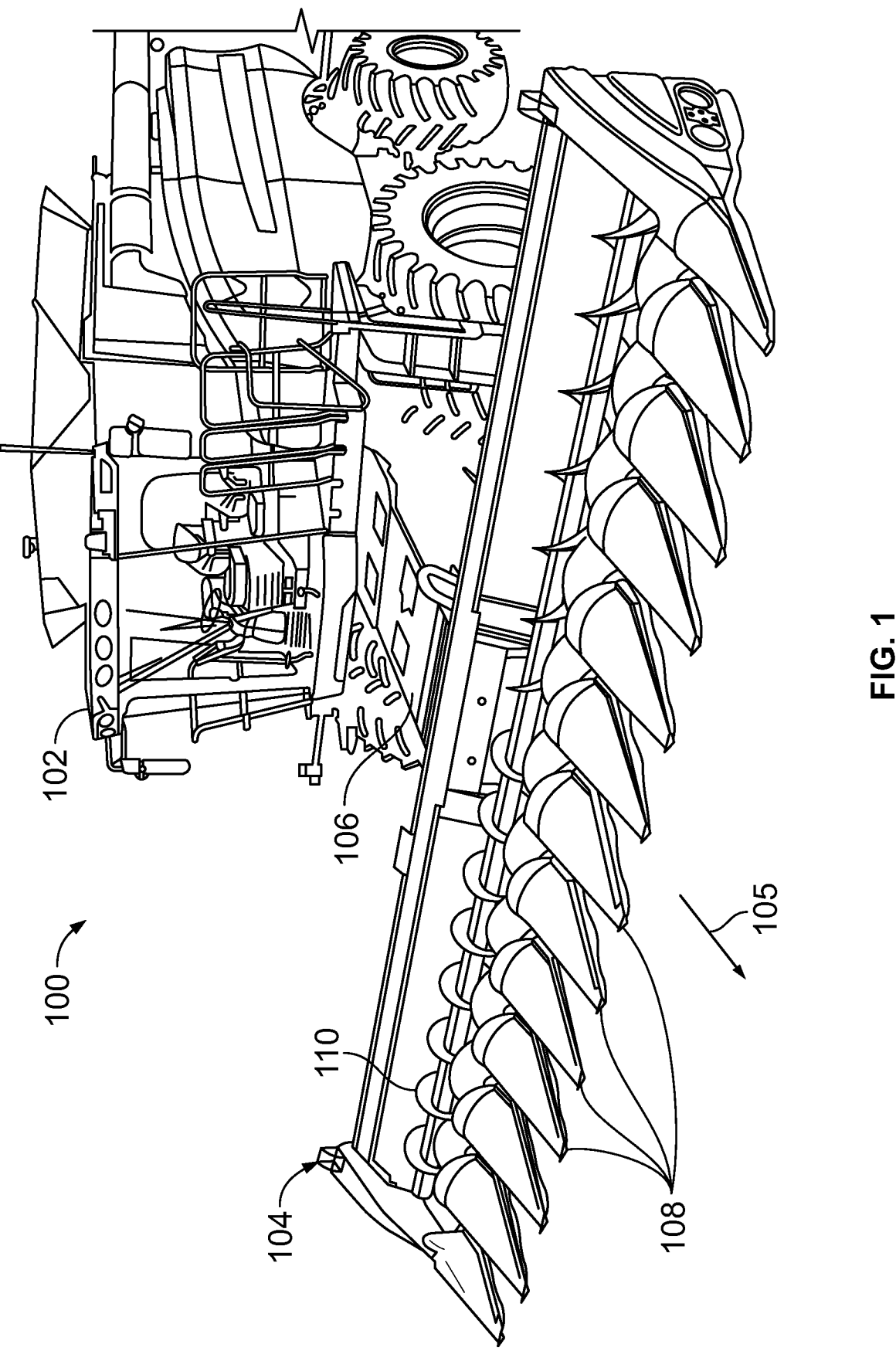
FIG. 1 illustrates a front side perspective view of an example combine harvester.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features may be shown in specific arrangements or orderings. However, it should be appreciated that such specific arrangements or orderings may not be required. Rather, in some embodiments, such features may be arranged in a different manner or order than shown in the illustrative figures. Additionally, the inclusion of a structural or method feature in a particular figure is not meant to imply that such feature is required in all embodiments and, in some embodiments, may not be included or may be combined with other features.

A number of features described below may be illustrated in the drawings in phantom. Depiction of certain features in phantom is intended to convey that those features may be hidden or present in one or more embodiments, while not necessarily present in other embodiments. Additionally, in the one or more embodiments in which those features may be present, illustration of the features in phantom is intended to convey that the features may have location(s) or position(s) different, or both, from the corresponding locations(s) and position(s) shown.

FIG. 1 illustrates a front side perspective view of one example of a combine harvester 100, also referred to as a harvester or harvesting machine. The illustrated harvester 100 includes an operator compartment 102 and a corn header 104 is affixed thereto. While, for at least purposes of illustration, embodiments discussed herein may reference a particular type of plant or crop, namely corn, it is understood that either the combine harvester 100 or header 104, or both, as well as other aspects of the subject disclosure, can be configured to harvest other crops, including, but not limited to, sunflower.

As combine harvester 100 travels in a direction of travel generally indicated by the arrow 105 in FIG. 1, the corn header 104 can engage corn crops, separate the cars of corn from the associated stalks, and feed the separated cars through a feeder house 106 back to other crop processing functionality in harvester 100. The header 104 illustratively includes a plurality of row dividers 108 that travel between the rows or the crop, or corn rows, and help to feed crop into the header 104, such as by lifting lodged crop. According to certain embodiments, stalks can travel rearwardly between the row dividers 108, where the stalks are engaged by gathering chains 112 (FIG. 2) and by a separator, such as, for example, a snapping roller, that separates the cars of corn from the cornstalks. The cars are then to be fed backward toward an auger 110 that moves the separated cars of corn to a central area of header 104 where the cars can be fed into the feeder house 106.

Figure 2:
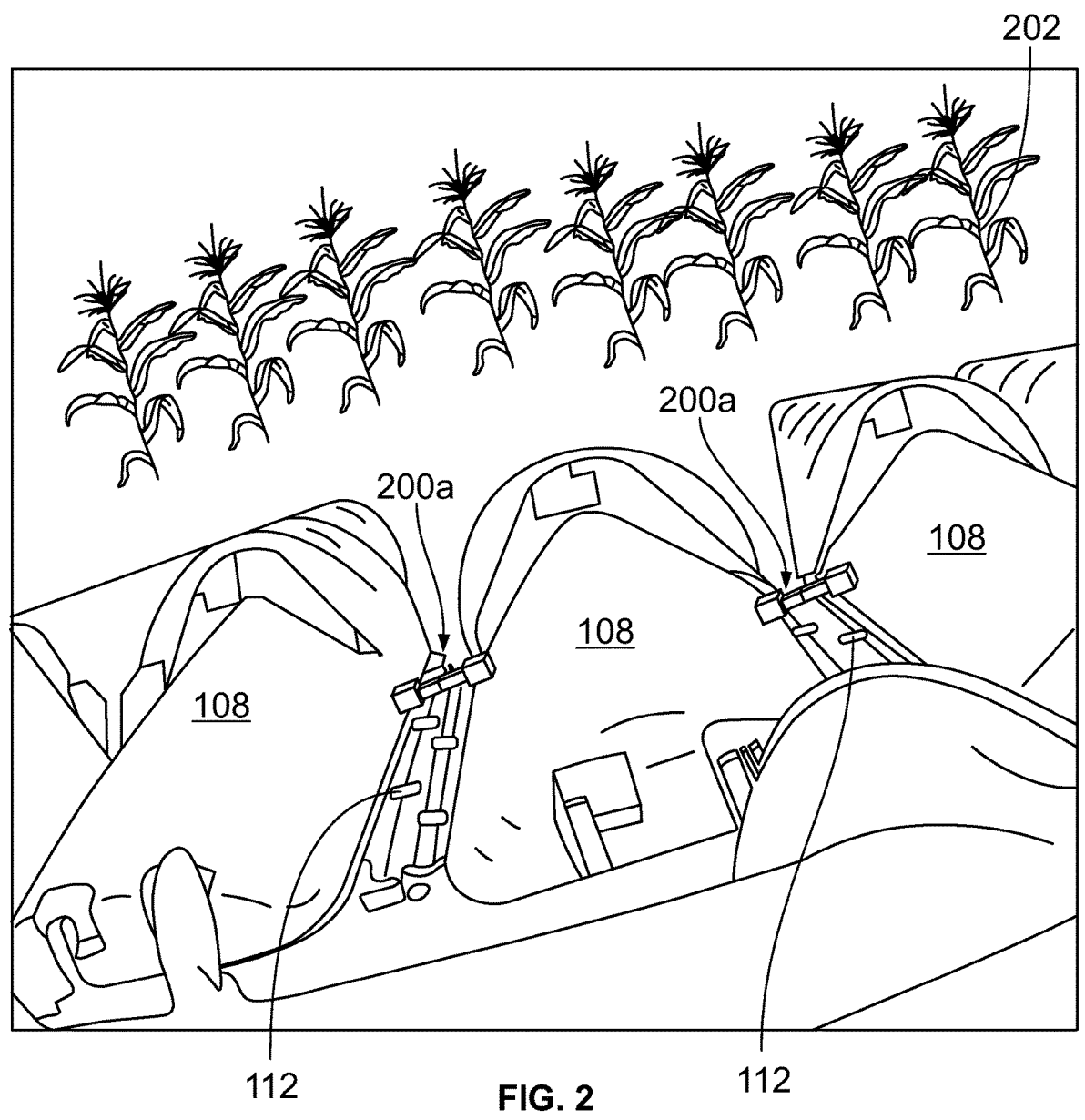
FIG. 2 illustrates a perspective view of an example corn header on a combine harvester and having at least a portion of a crop stabilizer and measurement system mounted thereon that is configured to measure characteristics of the crop.

In at least certain instances, after the ears of corn are separated from the stalks, the separated cars can bounce off of the header 104 and travel in a generally forward direction that can generally correspond to the forward direction of travel of the harvester 100, as indicated by the arrow 105. In such instances, the corn can fall onto the adjacent ground or soil. In such instances, the harvester 100 can pass over the fallen cars of corn such that the corn is not processed, thereby contribution to yield loss. In at least an attempt to prevent such loss, as seen in FIG. 2, according to certain embodiments, one or more gathering chains 112 can be disposed between adjacent crop dividers 108. Such gathering chains, 112 are driven in a direction at least in the area between the adjacent dividers 108 toward the feeder house 106 and, thereby, can assist with stalks traveling backward toward feeder house 106. By facilitating such travel, the gathering chains 112 can assist in preventing or minimizing separated ears from being able to fall onto the ground.

Figure 3:
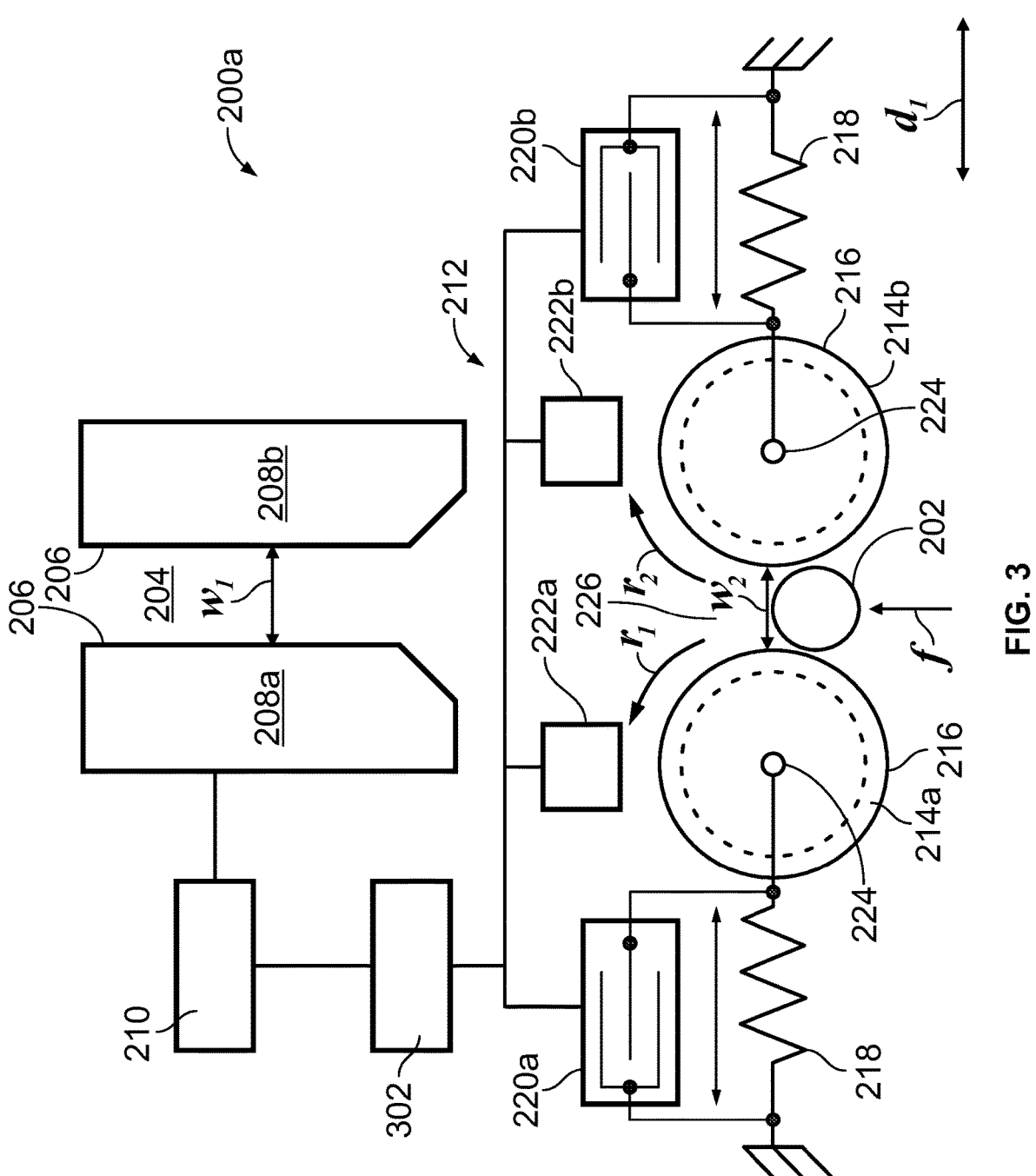
FIG. 3 illustrates a schematic representation of a portion of an exemplary crop stabilizer and measurement system.

Referencing FIGS. 2 and 3, according to certain embodiments, at least a portion of a crop stabilizer and measurement system 200*a* can be positioned between one or more, if not all, adjacent crop dividers 108. The crop stabilizer and measurement system 200 can be adapted to stabilize and measure a size, such as, for example, cross-sectional size or shape, including, but not limited to a diameter, of a portion of a crop, such as, for example, a stalk 202, prior to the crop reaching a gap 204 between opposing inner walls 206 of adjacent deck plates 208*a*, 208*b*. The obtained size measurement can provide an indication as to the extent, or distance, if any, at least one of the deck plates 208*a*, 208*b* is to be moved, such as, for example, via operation of an actuator 210 in a direction generally along an axis indicated by $d_1$ in FIG. 3, toward/away from the other deck plate 208*a*, 208*b*. Moreover, the measured size of the crop can indicate whether a current size, such as, for example a width (as generally indicated by "w" in FIG. 3) of the gap 204 between the opposing inner walls 206*a*, 206*b* of the deck plates 208*a*, 208*b* is to be adjusted and, if the width of the gap 204 is to be adjusted, the extent or degree to which the width of the gap 204 is to either be increased or decreased.

According to certain embodiments, a first deck plate 208*a* can be coupled to the actuator 210 so as to be displaced (e.g., linearly) via operation of the actuator 210 and relative to at least the second, other deck plate 208*b*, with the position of the second deck plate 208*b* relative to the first deck plate 208*a* remaining generally static. Thus, according to such an embodiment, adjusting the size of the gap 204, such as, for example, the width of the gap 204, can involve inwardly or outwardly displacing the first deck plate 208*a* relative to the second deck plate 208*b*. However, according to other embodiments, each of the first deck plate 208*a* and the second deck plate 208*b* can be coupled to the same, or a different, actuator 210 so that both the first and second deck plates 208*a*, 208*b* can be displaceable so as to adjust the width of the gap 204.

Referencing FIG. 3, according to certain embodiments, the crop stabilizer and measurement system 200*a* includes a sensor system 212, a first stabilizer 214*a*, and a second stabilizer 214*b*. The stabilizers 214*a*, 214*b* can be configured to physically stabilize a portion of the crop, such as, for example, a stalk 202, as the harvester 100 is moving forward in the direction 105 of travel in a manner. Stabilization of the crop can assist in attaining information by one or more sensors that accurately represents a cross-sectional size or shape of the crop, such as, but not limited to, a cross-sectional size of the stalk 202. That is, the stabilization allows the one or more sensors to accurately measure a cross-sectional size of the crop, for example the cross-sectional size of the stalk 202 or a dimension representative of the cross-sectional size of the stalk 202.

According to certain embodiments, in the absence of a portion of a crop, such as, for example the stalk 202 of the crop, being positioned between the stabilizers 214*a*, 214*b*, an outer surface 216 of the first stabilizer 214*a* can be engaged with an outer surface 216 of the other stabilizer 214*b*. Thus, according to such an embodiment, in at least the area along which the stalk 202 is to pass between the stabilizers 214*a*, 214*b*, the stabilizers 214*a*, 214*b* can initially be in contact with each other. Such engagement of the outer surfaces 216 of the stabilizers 214*a*, 214*b* and the lack of a space therebetween can be achieved, at least in part, via a generally inwardly directed force being provided against the stabilizers 214*a*, 214*b* via a first biasing element 218. Moreover, as seen by at least FIG. 3, at least one of the first and second stabilizers 214*a*, 214*b*, if not both stabilizers 214*a*, 214*b*, is/are coupled to a first biasing element 218, such as, for example, a spring, spring-coil, hydraulic cylinder, or air cylinder, as well as combinations thereof, among other types of biasing elements, that biases the stabilizer 214*a*, 214*b* toward, and into contact with, the other stabilizer 214*a*, 214*b*.

The stabilizers 214*a*, 214*b* can have a variety of shapes and configurations and be constructed from non-deformable or deformable materials, as well as combinations thereof. For example, according to the embodiment shown in at least FIG. 3, the stabilizers 214*a*, 214*b* are wheels or cylinders having round or circular cross-sectional shapes. Additionally, the stabilizers 214*a*, 214*b* can be constructed from a variety of metallic or non-metallic materials, as well as combinations thereof. For example, according to certain embodiments, the stabilizers 214*a*, 214*b* can be constructed from a stainless steel material, among other steels or metals. Further, according to certain embodiments, the stabilizers 214*a*, 214*b* can be constructed from one or more ferromagnetic or electrically conductive materials that can assist one or more sensors 220*a*, 220*b*, 222*a*, 222*b* of the sensor system 212 with detecting movement or displacement of one or more of the stabilizers 214*a*, 214*b*. Additionally, according to certain embodiments, at least a portion of the stabilizers 214*a*, 214*b* can be constructed from a shape deformable material, including, for example, a memory foam, among other deformable materials, as discussed below.

The stabilizers 214*a*, 214*b* can also be adapted to be rotated around an axis, such as, for example, about a pin, post, or shaft 224, that can be directly or indirectly coupled to an adjacent crop divider 108. Such a shaft 224 can, according to certain embodiments, be rotated via use of bearings. Additionally, as discussed below in more detail, the crop stabilizer and measurement system 200*a* can be adapted such that one or both of the stabilizers 214*a*, 214*b* and the associated shafts 224 is/are outwardly displaceable (e.g., along an axis generally indicated by "$d_1$" in FIG. 3) away from the other stabilizer 214*a*, 214*b*. Such displacement can be associated with the stalk 202, or other crop portion, entering into, and opening or increasing, a width of the space 226 between the stabilizers 214*a*, 214*b*. One or both of the stabilizers 214*a*. 214*b* can be subsequently inwardly displaced toward the other stabilizer 214*a*, 214*b* as the stalk 202 is leaving the space 226 or is no longer present between the stabilizers 214*a*, 214*b*.

The crop stabilizer and measurement system 200*a* can also include one or more sensors 220*a*, 220*b*, 222*a*, 222*b* that can detect features related to movement of one or more stabilizers 214*a*, 214*b*. Information from such sensors 220*a*, 220*b*, 222*a*, 222*b* can be used in a determination of the size of the crop, such as, for example, stalk 202, that is entering, is present, is leaving, or has left the space 226 between the stabilizers 214*a*, 214*b*. For example, the crop stabilizer and measurement system 200*a* can include, for one or both of the stabilizers 214*a*, 214*b*, a first sensor 220*a*, 220*b* or a second sensor 222*a*, 222*b*, or both first and second sensors 220*a*, 220*b*, 222*a*, 222*b*. Further, the first and second sensors 220*a*, 220*b*, 222*a*, 222*b* can be configured to detect similar or different characteristics associated with the movement of the associated stabilizer 214*a*, 214*b*.

According to an exemplary embodiment, the first sensor 220*a*, 220*b* can be adapted to detect the extent an associated stabilizer 214*a*, 214*b* is at least outwardly displaced, or displaced in a direction generally away from the other stabilizer 214*a*, 214*b*, as the stalk 202 passes through the space 226 between the stabilizers 214*a*, 214*b*. A variety of different types of displacement, movement, or position sensors can be utilized for the first sensor 220*a*, 220*b*, including, for example, linear variable differential transformer (LVDT) sensors and inductive sensors, among types of sensors. Information provided by the first sensor 220*a*, 220*b* regarding displacement, movement, or position of an associated stabilizer 214*a*, 214*b* can be used by a control system 300 or a controller 302 (FIG. 4), or both, of the system 200*a* to determine the corresponding cross-sectional size of the stalk 202 that is, or has, passing/passed between the stabilizers 214*a*, 214*b*.

According to certain embodiments, the second sensor 222*a*, 222*b* can be adapted to sense characteristics associated with the rotation of one or more of the first and second stabilizers 214*a*, 214*b*. Thus, for example, according to certain embodiments, the second sensor 222*a*, 222*b* can be a rotary sensor, including, but not limited to, a variable reluctance sensor. According to such an embodiment, the rotational speed or velocity of the stabilizer 214*a*, 214*b*, as detected by the adjacent second sensor 222*a*, 222*b*, can provide information to the controller 302 that can be used in connection with the controller 302 determining the corresponding size, such, as, for example, cross-sectional size, of the stalk 202 passing through the space 226 between the stabilizers 214*a*, 214*b*. According to other embodiments, the second sensor 222*a*, 222*b* can be a proximal sensor that can be used to sense a change in the distance between the stabilizer 214*a*, 214*b* and the associated second sensor 222*a*, 222*b*.

According to certain embodiments, the system 200*a* has a first sensor 220*a*, 220*b* or a second sensor 222*a*, 222*b*, or both, for each of the first and second stabilizers 214*a*, 214*b*. The inclusion of pairs of the first sensors 220*a*, 220*b* or second sensors 222*a*, 222*b*, or both, can be utilized to address situations in which the stalk 202 being measured is offset relative to a central location between the stabilizers 214*a*, 214*b*. For example, generally the harvester 100 may be operated such that at least the portion of crop engages the crop stabilizer and measurement system 200*a* at a location that is generally aligned with the location at which the outer surfaces 216 of the first and second stabilizers 214*a*, 214*b* are in contact with each other, and thus generally centrally located between the stabilizers 214*a*, 214*b* or the area between the corresponding adjacent row units 108. In the event the stalk 202 engages the stabilizers 214*a*, 214*b* at a location that is offset from the central location between the stabilizers 214*a*, 214*b*, one of the first and second stabilizers 214*a*, 214*b* can be outwardly displaced by a distance that is greater than the distance at which the other of the first and second stabilizers 214*a*, 214*b* is outwardly displaced. Indeed, depending on the degree of offset, in a relatively extreme scenario, one of the stabilizers 214*a* could potentially be further outwardly extended in a direction generally toward the same row divider 108 that the other stabilizer 214*b* is being generally moved towards the other stabilizer 214*a*.

While for at least purposes of description the terms first and second are used with respect to the sensors 220*a*, 220*b*, 222*a*, 222*b*, either the first sensor(s) 220*a*, 220*b* or the second sensor(s) 222*a*, 222*b* can also be referred to as a primary sensor(s), while the other of the first sensor(s) 220*a*, 220*b* and the second sensor(s) 222*a*, 222*b* can be referred to as the secondary sensor(s). Such primary and secondary designations can also be used in terms of reference to the degree of reliance, deference, or weight at which information provided by the primary sensor is given when compared to the information from the secondary sensor. For example, in the event discrepancies between size determinations made by the controller 302 based on information from the primary sensor and from the secondary sensor exceed a threshold value or exceed a threshold value over a certain number of measurement determinations, the controller 302 may not rely on, or give lesser value to determination made using information from the secondary sensors. Further, in response to such discrepancies, the controller 302 can generate a signal that can be used in connection with providing an alert to the operator of the harvester 100 of a possible maintenance or calibration issue.

Figure 4:
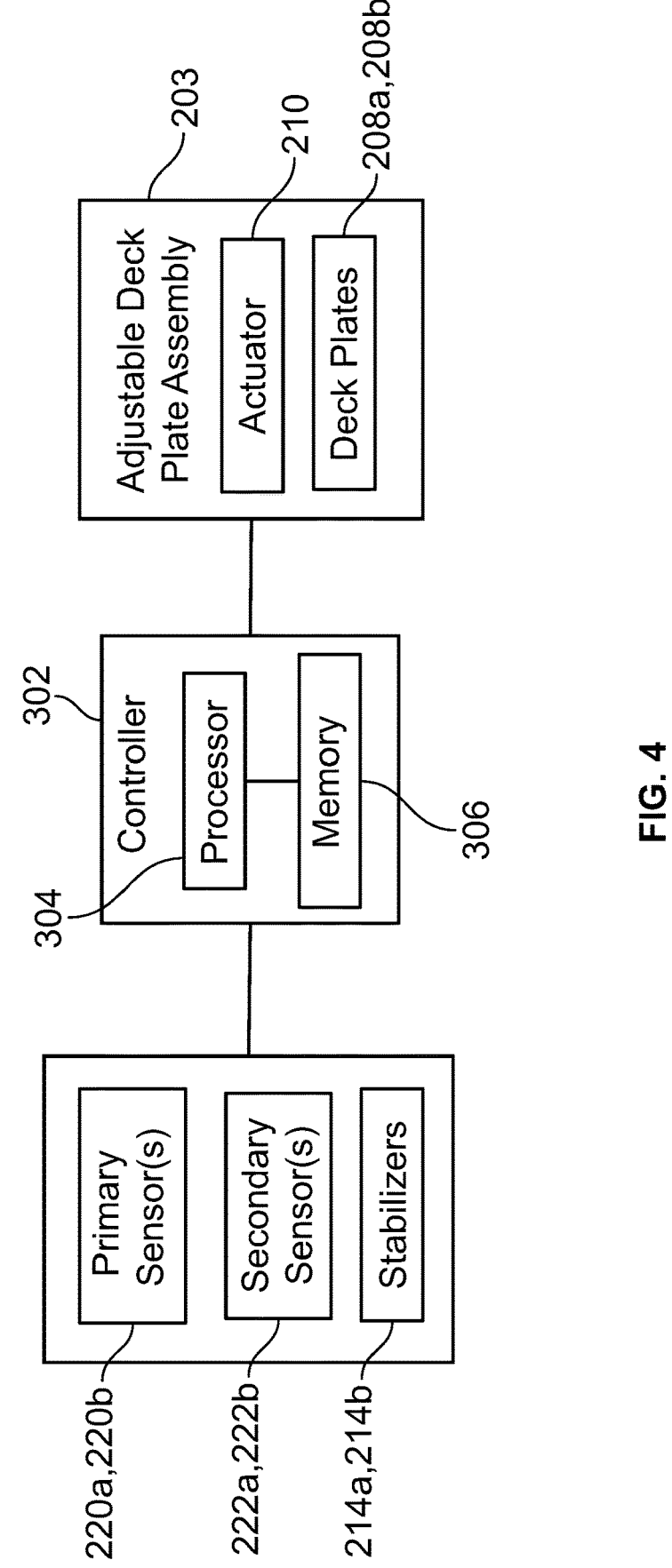
FIG. 4 illustrates a block diagram of a control system for an exemplary crop stabilizer and measurement system.

FIG. 4 illustrates a block diagram of an exemplary control system 300 for the crop stabilizer and measurement system 200*a*, as well as for other embodiments of the crop stabilizer and measurement system disclosed herein. As seen, information obtained by the first and second sensors 220*a*, 220*b*, 222*a*, 222*b* from engagement of the stabilizers 214*a*, 214*b* with the crop, such as, for example, with the stalk 202 of the crop, can be communicated to the controller 302 of the control system 300. The controller 302 can include at least one or more processors 304 and one or more memory devices 306. The processor 304 can be embodied as any type of processor or other compute circuit capable of performing various tasks such as, for example, correlating to information from the sensor(s) 220*a*, 220*b*, 222*a*, 222*b* to corresponding crop size, computation, and controlling communication with other components of the crop stabilizer and measurement system 200*a*, among other functions. In some embodiments, each processor 304 can be embodied as a single or multi-core processor, a microcontroller, or other processing/controlling circuit. Additionally, in some embodiments, each processor 304 may be embodied as, include, or be coupled to an FPGA, an application specific integrated circuit (ASIC), reconfigurable hardware or hardware circuitry, or other specialized hardware to facilitate performance of the functions described herein. In some embodiments still, each processor 304 can be embodied as a high-power processor, an accelerator co-processor, an FPGA, or a storage controller.

Each memory device 306 can be embodied as any type of volatile (e.g., dynamic random access memory (DRAM), etc.) or non-volatile memory capable of storing data therein. Volatile memory can be embodied as a storage medium that requires power to maintain the state of data stored by the medium. Non-limiting examples of volatile memory can include various types of random access memory (RAM), such as dynamic random access memory (DRAM) or static random access memory (SRAM). In some embodiments, each memory device 306 can be embodied as a block addressable memory, such as those based on NAND or NOR technologies. Each memory device 306 can also include future generation nonvolatile devices or other byte addressable write-in-place nonvolatile memory devices. Additionally, in some embodiments, each memory device 306 can be embodied, or otherwise include, a memory device that uses chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. Each memory device 306 can refer to the device itself or to a packaged memory product. In some embodiments still, 3D crosspoint memory can comprise a transistor-less stackable cross point architecture in which memory cells sit at the intersection of word lines and bit lines and are individually addressable and in which bit storage is based on a change in bulk resistance. In some embodiments yet still, all or a portion of each memory device 306 can be integrated into the processor(s) 304. Regardless, each memory device 306 can store various software and data used during operation such as task request data, kernel map data, telemetry data, applications, programs, libraries, and drivers. Further, according to certain embodiments, the memory device 306 can include tables, models, or algorithms, among other information, that can be utilized by the processor 304 in connection with determining a size, such as a cross-sectional size, of the crop based on information provided to the controller 302 from one or more sensors of the systems discussed herein.

In some examples, crop size, including, for example, a cross-sectional size of stalks 202, can be stored in memory 306 or other database for agronomic analysis related to crop or soil characteristics such as yield. For example, variations in the cross-sectional size of stalks can indicate that a crop density in at least a portion of a field may be preventing certain crops adequate access to sunlight. Further, the crop size, such as, for example, cross-sectional sizes of stalks 202, can provide information regarding soil content, including for example, whether levels of nitrogen fertilizers are to be adjusted or information regarding the efficiency of such fertilizers. Further, such crop sizes, alone, or with other sizes, including, for example, crop height, can be utilized to estimate a crop yield, as well as provide a basis for comparisons with other crop sizes and yields over various time periods. Therefore, in at least certain embodiments, the crop size information obtained by embodiments disclosed herein can retrieved be utilized, such as, for example, by a central controller or other computing device in connection with performing an agronomic analysis that can provide information relating to crop or soil characteristics, including, but not limited to, crop yield.

The crop stabilizer and measurement system 200*a* can further include an adjustable deck plate assembly 203 comprising one or more actuators 210 and the deck plates 208*a*, 208*b*. The actuator 210 is communicatively coupled to the controller 302 and is utilized to provide a displacement force that can be directly or indirectly transmitted to the one or more of the deck plates 208*a*. 208*b*. A variety of different types of devices can be utilized as the actuator 210, including, for example, electric actuators, hydraulic actuators, pneumatic actuators, rotary actuators, and linear actuators, among others. As previously discussed, according to certain embodiments, at least one of the deck plates 208*a*, 208*b* can be displaceable at least relative to the other deck plate 208*a*. 208*b* via operation of the actuator 210 so as to adjust the width of the gap 204 while the other deck plate 208*a*, 208*b* remains, relative to the displaced deck plate 208*a*, 208*b*, generally static. However, according to other embodiments, operation of the actuator 210, or multiple actuators 210, can cause displacement of both deck plates 208*a*, 208*b*. The extent that the actuator(s) 210 displaces the deck plate(s) 208*a*, 208*b* can be based on the current size of the width of the gap 204 between the deck plate(s) 208*a*, 208*b* and the size of the crop, or stalk 202, as determined by the controller 302 from information provided by one or both of the first and second sensors 220*a*, 220*b*, 222*a*, 222*b*. Thus, for example, according to certain embodiments, the controller 302 can operate the actuator 210 until the controller 302 determines, either by the duration or extent of operation of the actuator 210, or from information provided to the controller 302, that the width of the gap 204 between the deck plates 208*a*, 208*b* has reached a size that corresponds to the size, such as, for example, the cross-sectional size, of the crop, or stalk 202, as determined by the controller 302 using, at least in part, the information from either or both the first and second sensors 220*a*. 220*b*, 222*a*, 222*b*.

Figure 5:
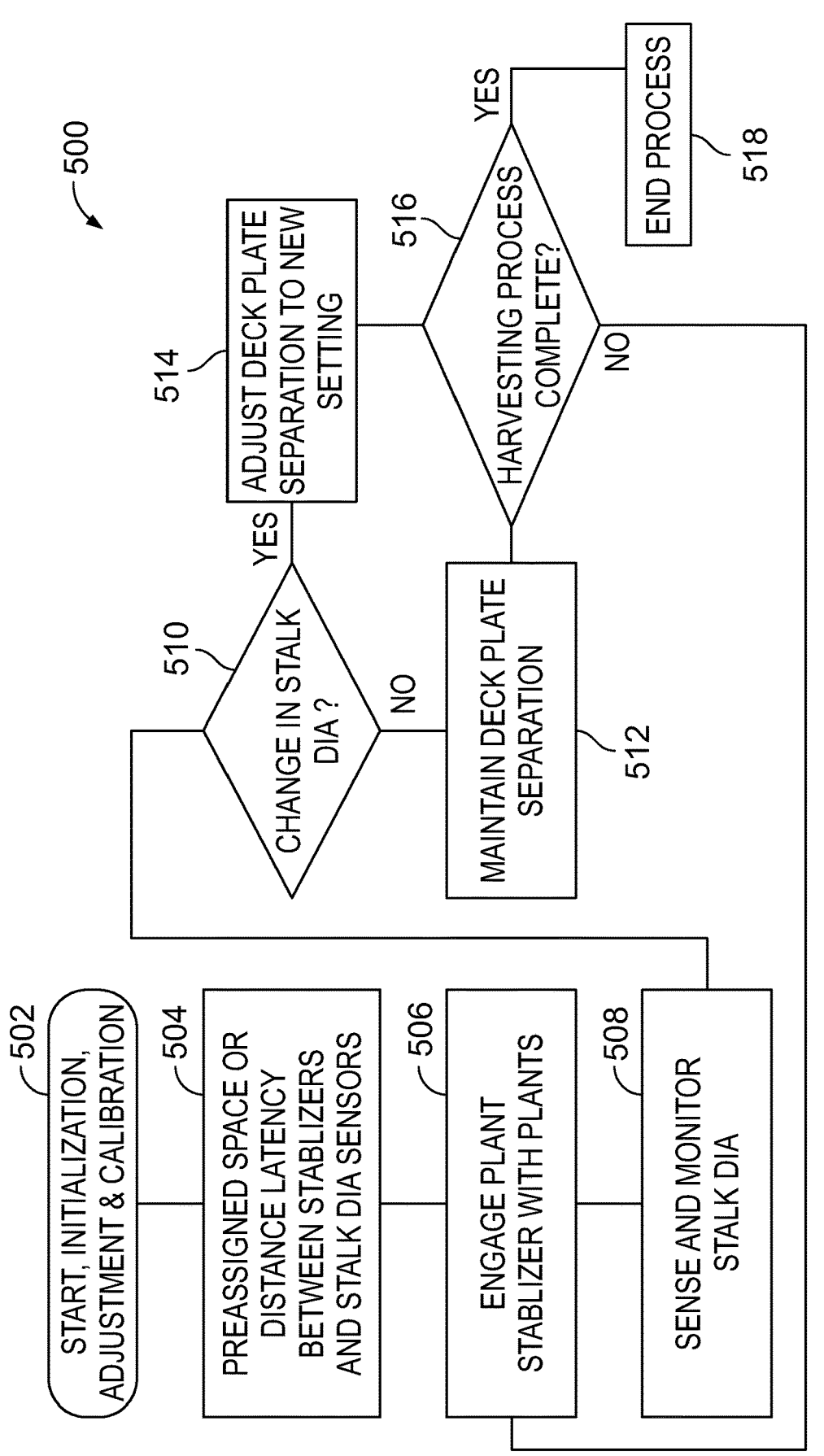
FIG. 5 illustrates a simplified flow chart of a method that can be performed by at least the control system shown in FIG. 4 for operating a crop stabilizer and measurement system.

FIG. 5 illustrates a simplified flow chart of a method 500 that can be performed by at least the control system 300 shown in FIG. 4 for operating the crop stabilizer and measurement system 200*a*, as well as for operating other embodiments of the crop stabilizer and measurement systems 200*b* through 200*k* disclosed herein. The method 500 corresponds to, or is otherwise associated with, performance of the blocks described below in the illustrative sequence of FIG. 5. It should be appreciated, however, that the method

500 can be performed in one or more sequences different from the illustrative sequence.

At block 502, the crop stabilizer and measurement system 200*a* can be activated, which can include initialization, adjustment, or calibration of one or more components of the system 200*a*. For example, block 502 can include calibrating one or more of the of the first and second sensors 220*a*, 220*b*, 222*a*, 222*b* with respect to linear or rotary, or both, displacement of the stabilizers 214*a*, 214*b* and the corresponding size, such as, for example, the cross-sectional size of the stalk 202, associated with such displacement.

At block 504, a preassigned space or distance latency can be established between the stabilizers 214*a*, 214*b* and the first or second sensors 220*a*, 220*b*, 222*a*, 222*b*, or both, as well as with respect to the deck plates 208*a*. 208*b*. For example, at block 502 the size of the width of the gap 204 between the decks plates 208*a*, 208*b* can be checked or set. Moreover, at block 504, a position of one or both of the deck plates 208*a*, 208*b* can be checked or adjusted such that the width of the gap 204 therebetween is at or around an anticipated size, such as, for example cross-sectional size, of the stalk 202 that is to enter into the gap 204 during operation of the combine harvester 100. According to certain embodiments, the width of the gap 204 between the deck plates 208*a*, 208*b* can be adjusted via the controller 302 issuing a corresponding command for operation of the actuator(s) 210 to attain the selected width of the gap 204. Such operation of the actuator(s) 210 can provide the controller 302 with information regarding the width of the gap 204, which can later be used in connection with the controller 302 determining whether to, or not to, actuate the actuator 210 for adjustment of the size of the width of the gap 204, as discussed below.

At block 506, during operation and forward travel of the harvester 100, a portion of the crop, which, again in this example, is the stalk 202, can come into engagement with the stabilizers 214*a*, 214*b*. As previously discussed, such engagement can cause the stabilizers 214*a*, 214*b* to be opened from a position at which a portion of the outer surfaces 216 of the stabilizers 214*a*, 214*b* are in direct contact with each other, to a position at which the stabilizers 214*a*, 214*b* are separated by a space 226, at least a portion of which is occupied by the stalk 202. As previously discussed, according to at least the embodiment of the crop stabilizer and measurement system 200*a* depicted in FIG. 3, such opening of the space 226 between the stabilizers 214*a*, 214*b* can correspond to both linear (or non-linear) and rotational displacement of the stabilizers 214*a*, 214*b*. Such displacement of the stabilizers 214*a*, 214*b*, and moreover the extent of such displacement can be detected by the first and second sensors 220*a*, 220*b*, 222*a*, 222*b* at block 508 and communicated via a wired or wireless signal(s), or both, to the controller 302. Using at least information from the first or second sensors 220*a*. 220*b*, 222*a*. 222*b*, or both, the controller 302 can determine a measured size of at least the portion of the stalk 202 that was positioned in the space 226 between the stabilizers 214*a*, 214*b*. As previously mentioned, in some examples the measured size is stored in memory 306 for agronomic analysis.

Using at least the measured size from block 508, at block 510 the controller 302 can determine whether there has been a change in the size of the crop, such as, for example, whether the cross-sectional size of the stalk 202 has changed in relation to the prior stalk 202 that engaged the system 202*a* or with respect to a preassigned stalk cross-sectional size. Such a determination by the controller 302 can be based, at least in part, on comparing the size measured at block 508 with a preexisting size, such as, for example the crop size used at block 504 for determining a width of the space 226 between the deck plates 208a, 208b, prior crop sizes used in connection a prior adjustment in the width of the gap 204, if any, or the current set width of the gap 204 between the deck plates 208a, 208b. Thus, according to certain embodiments, each time the width of the gap 204 between the deck plates 208a, 208b is adjusted, the corresponding size of the crop or the current width of the gap 204 between the deck plates 208a, 208b can be used for purposes of comparison at block 510 with the current crop size measurement obtained at block 508. Further, a determination of whether there is a change in crop size, and thus whether the width of the gap 204 between the deck plates 208a, 208b is to be adjusted, can be based at least in part of a determination that any such differences, as determined at block 510, exceed a threshold value or is outside of a predetermined tolerance.

If a determination is made at block 510 that the crop size has not changed, or that any such differences are within a predetermined tolerance, then at block 512 the controller 302 can determine to maintain the current width of the space 226 between the deck plates 208a, 208b. However, if a determination is made, for example, by the controller 302, to adjust the width of the gap 204 between the deck plates 208a, 208b, then at block 514 the controller 302 can issue a command that facilitates, via operation of the actuator(s) 210, displacement of one or both of the deck plates 208a, 208b so that the width of the gap 204 between the deck plates 208a, 208b is adjusted accordingly. Further, the extent of the differences determined at block 510, as well as the measured size of the crop from block 508, can be used by the controller 302 to determine a size for the width of the gap 204 between the deck plates 208a. 208b. Using at least this determined size, as well as knowledge or information of the current size of the width of the gap 204, the controller 302 can determine the extent the actuator 210 is to be operated so as adjust the width of the gap 204 so as to accommodate the crop, and moreover the cross-sectional size of the stalk 202, that is currently approaching the deck plates 208a, 208b or which has been measured.

Following blocks 512 and 514, a determination can be made, such as, for example, via the controller 302 or a user input, as to whether the crop harvesting operation has been completed or if the crop stabilizer and measurement system 200a is to continue operation. If the crop process is still continuing, the method 500 can return to block 506, wherein another, or next, crop, can engage the stabilizers 214a. 214b, and the process of measuring the size of the stabilized crop, determining if the measured size warrants an adjustment in the width of the gap 204, and, if so, operating the actuator 210 to make such a change in the width of the gap 204 between the deck plates 208a, 208b can be repeated. Such a process can be repeated until a determination is made at block 516 that the crop harvesting operation has been completed or the crop stabilizer and measurement system 200a is to, at least currently, cease operation, wherein the process 500 can be completed or terminated at block 518.

Figure 6A:
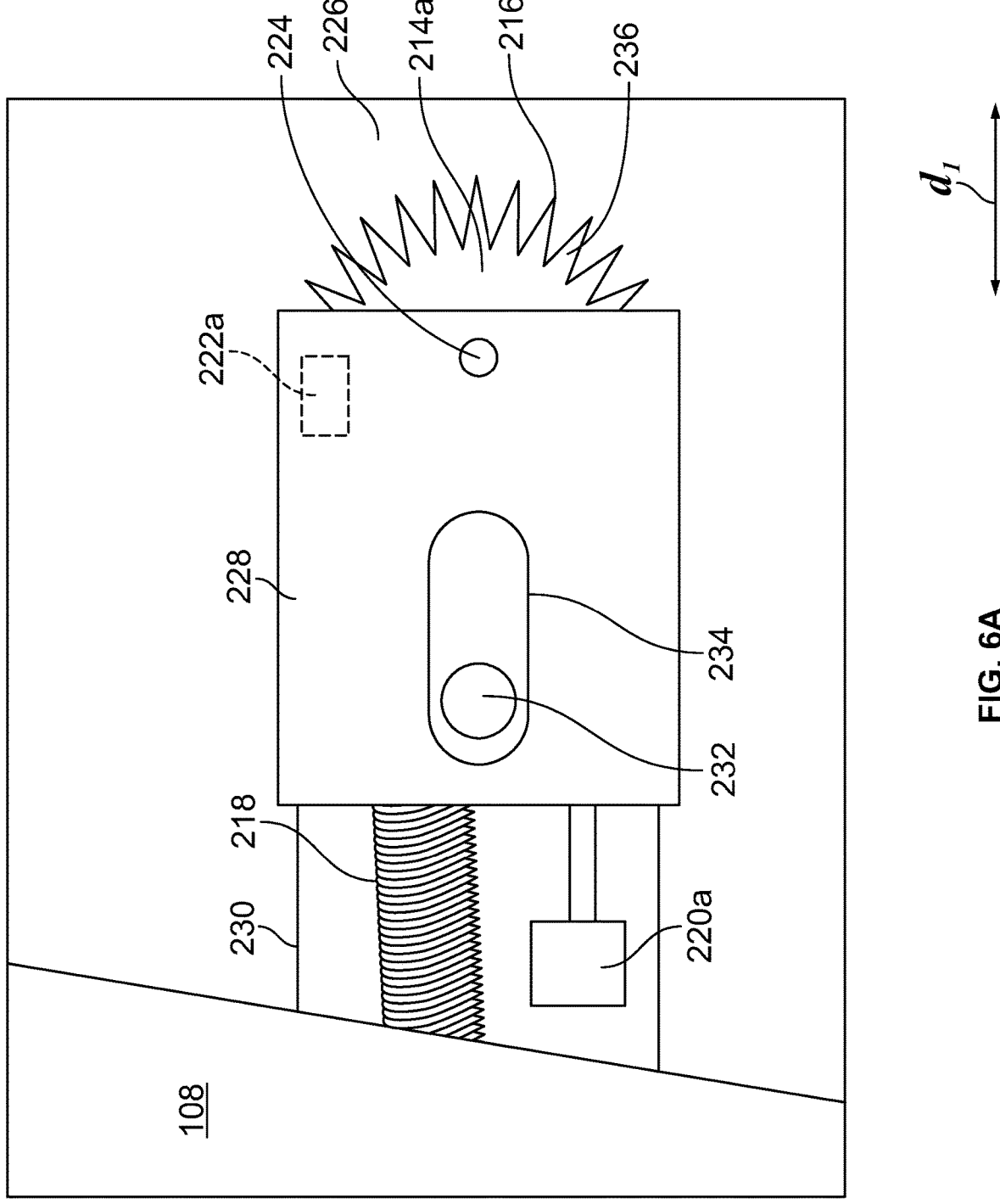
FIG. 6A illustrates a top view of a portion of one embodiment of the exemplary crop stabilizer and measurement system shown in FIG. 3.

FIG. 6A illustrates an exemplary embodiment the crop stabilizer and measurement system 200a. According to the illustrated embodiment, the first stabilizer 214a is securely coupled to a housing 228, such as, for example, via the shaft 224, among other manners of coupling. The illustrated embodiment further includes an arm 230 that is telescopically arranged relative the housing 228, and which is secured to a row divider 108. Thus, for example, the housing 228 can slide over at least a portion of the arm 230, or vice versa.

According to the illustrated embodiment, the housing 228, and thus the first stabilizer 214a, are outwardly biased toward the second stabilizer 214b (not shown in FIG. 6A) by the first biasing element 218. Accordingly, as the crop opens a space 226 between the stabilizers 214a, 214b, as well as increases the width of the opened space 226 between the stabilizers 214a, 214b while passing through the space 226, the crop can provide a force sufficient to overcome the biasing force of the first biasing element 218, thereby outwardly displacing the first stabilizer 214a away from the second stabilizer 214b and towards the associated row divider 108. Such outwardly displacement of the first stabilizer 214a can be accompanied by the housing 228 being slidingly displaced relative to the arm 230.

According to certain embodiments, such displacement of the housing 228 relative to the arm 230 can be guided, such as, for example, via a sliding engagement between a guide protrusion 232 relative to a guide slot 234. For example, according to certain embodiments, one of the housing 228 and the arm 230 can include a guide protrusion 232 that matingly slides within a guide slot 234 that is provided by the other of the housing 228 and the arm 230. The combination of the guide protrusion 232 and the guide slot 234 or the relative sizes of the housing 228 and arm 230, can assist in guiding the displacement of at least the stabilizer 214a as the space 226 between the stabilizers 214a, 214b opens, changes in size, and subsequently closes upon the removal of the crop from between the stabilizers 214a, 214b.

As the stalk 202 of the crop moves through the space 226 between the stabilizers 214a, 214b, the engagement of the stalk 202 with the first and second stabilizers 214a, 214b can facilitate rotation of the first stabilizer 214a in a first direction (as generally indicated in FIG. 3 as "$r_1$"), such as, for example, a counterclockwise direction, and rotation of the second stabilizer 214b in a second, opposite direction, such as, for example, a clockwise direction (as generally indicated in FIG. 3 as "$r_2$"). Further, as seen in at least FIG. 6A, according to certain embodiments, one or both of the first and second stabilizers 214a. 214b can include a grip body 236, such as, for example, a plurality of teeth or serrations, among other protrusions or surface features, that can extend around at least a portion, if not all, of the outer periphery or wall of the stabilizer 214a, 214b. Such a grip body 236 can enhance the engagement between the stabilizer 214a, 214b and the stalk 202 so as to prevent the stalk from sliding pass the stabilizers 214a, 214b and without rotating the stabilizers 214a, 214b. Moreover, the grip body 236 or the biasing force of the first biasing element that is transmitted through the stabilizers 214a, 214b can assist in securing or stabilizing the stalk 202 as the system 200a obtains an associated size measurement, such as, for example, a measurement of the cross-sectional size of the stalk 202.

As discussed above, the movement of the stabilizers 214a, 214b can be directly or indirectly detected by either or both the first sensor 220a, 220b and the second sensor 222a, 222b. For example, in the embodiment illustrated in FIG. 6A, the first sensor 220a can be used to detect displacement of the stabilizer 214a indirectly via detection of displacement of the housing 228 to which the stabilizer 214a is coupled. Further, according to certain embodiments, displacement of the stabilizer 214a can further be detected by the second sensor 222a. According to embodiments in which the second sensor 222a is a proximity sensor, the second sensor 222a can be maintained at a position that is maintained at a relatively static position with respect to the displacement of the stabilizer 214a. For example, according to the illustrated embodiment, the second sensor 222a can be attached to the arm 230 along which the housing 228 is linearly displaced, among other manners or directions of displacement. Alternatively, the second sensor 222a can detect information relating to the rotation, or rotational speed, of the stabilizer 214a, in which case the second sensor 222b can be attached to the housing 228.

Figure 6B:
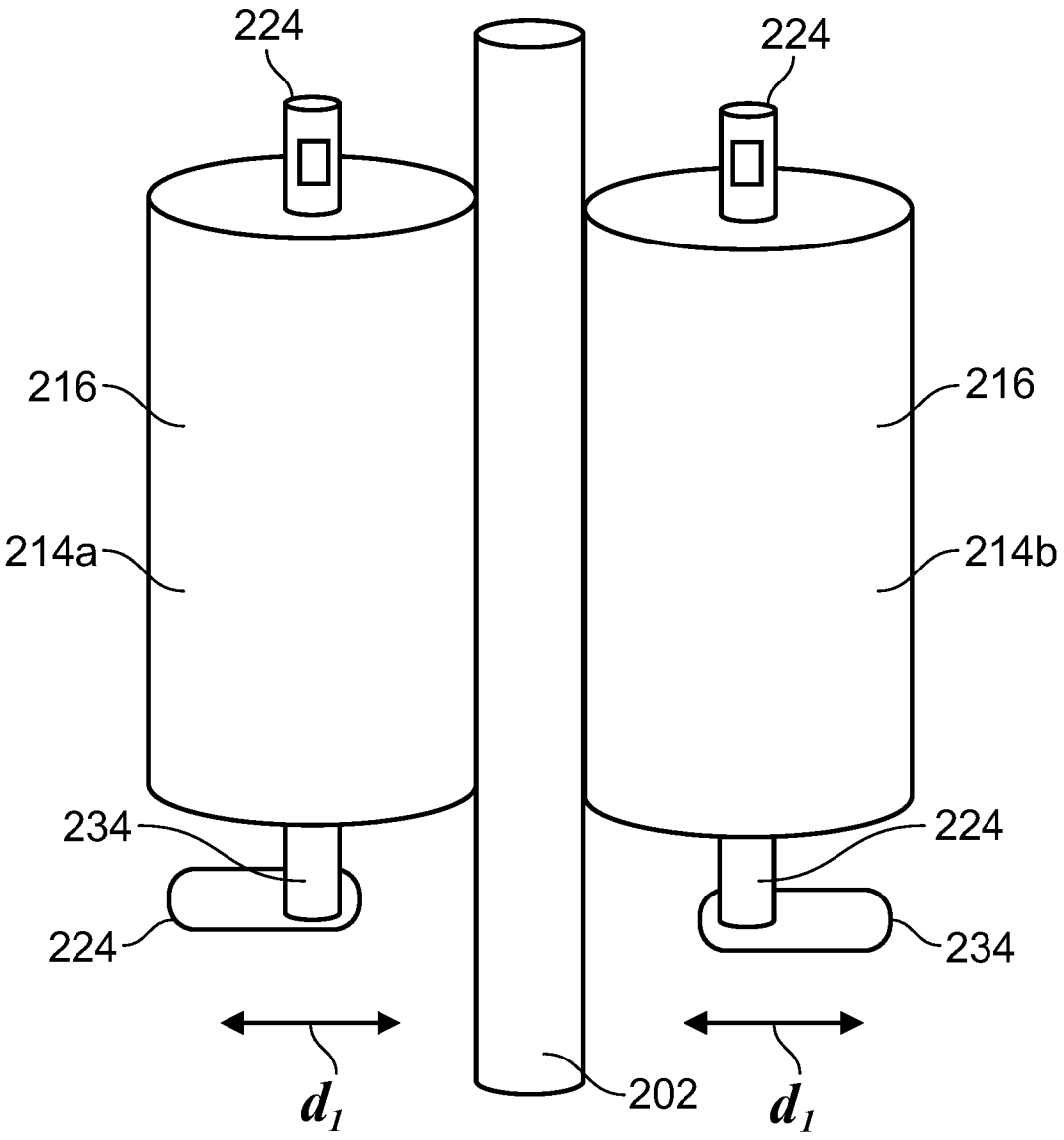
FIG. 6B illustrates another embodiment in which stabilizers are linearly displaceable relative to each other by a force provided on the stabilizers via engagement with a stalk.

FIG. 6B illustrates another embodiment in which the stabilizers 214a, 214b are displaceable, such as, for example, linearly displaced, relative to each other via a force provided on the stabilizers 214a, 214b via engagement with a stalk 202. In this exemplary illustrated embodiment, in addition to be rotatable, the shafts 224 of the stabilizers 214a, 214b can also be generally inwardly and outwardly displaced toward/away from at least each other along a mating guide slot 234. While not shown, the stabilizers 214a, 214b can again be biased to a position at which the stabilizers 214a, 214b are in contact with each other, such as, for example, via a biasing force provided by one or more biasing elements 218, as discussed above.

According to such embodiments, the relative positions of the shafts 224 of the stabilizers 214a, 214b, including the distance between the shafts 224 of the stabilizers 214a, 214b, can be sensed or otherwise measured via use of a sensor 220a, 220b, 222a, 222b. Further, a difference in the distance between the shafts 224 of the stabilizers 214a, 214b prior to engagement with the stalk 202, and the largest measured distance between the shafts 224 of the stabilizers 214a, 214b when engaged with the stalk 202, can provide an indication of the size, such as, for example, cross-sectional size, of the portion of the stalk 202 that is/was engaged with the stabilizers 214a, 214b. Such a size determination or measurement can then be used by the controller 302 in determining if, and to what extent, to operate an actuator(s) 210 to adjust a position of one or more of the deck plates 208a. 208b, as previously discussed.

The automatic adjustment of the size of the width of the gap 204 between the deck plates 208a. 208b via the operation of the crop stabilizer and measurement system 200a, as well attainable by other systems discussed herein, can minimize losses to harvesting yield that may otherwise associated with inaccurately pre-set gap widths. Moreover, the automatic setting of the width of the gap 204 by the system 200a can be prevent small ears of corn from falling through the gap 204, thereby minimizing such small ears from becoming lost yield. Further, such automatic adjustment in the gap 204 can prevent the width of the gap 204, from being too large, and thereby at least minimize the occurrence of butt shelling. The ability of the system 200a to automatically adjust the width of the gap 204 can also minimize the occurrence of excess materials, such as, for example, leaves from the stalk, weeds, and other debris from being collected by the corn header, which, when accumulated, can otherwise wrap on the auger. By preventing such wrapping of debris on the auger, such debris may not interfere with corn ears being effectively moved by the auger to a collection location. Such efficiency movement of corn by the auger can be beneficial to the capacity of the combine harvester, increase fuel efficiency, and decreased wear and maintenance costs. Further, such automatic adjustment of the width of the gap 204 can prevent stalks and other materials becoming plugged in the row unit, and thus prevent intake of subsequent crop from being impeded.

Additionally, the size of the stalks that are to pass through the gap 204 of the deck plates 208, 208b can vary, even within the same field and among the same crop type. For example, differences in soil moisture content and exposure to sunlight, among other variables that can impact crop growth, can impact the cross-sectional size of the stalks 202 that are to pass through the gap 204. Variations in plant type, such as, for example, hybrid versus non-hybrid crops, can also be associated with differences in the cross-sectional size of the stalks 202. Yet, differences the cross-sectional size of such stalks 202 can be automatically addressed by the system 202a, thereby eliminating challenges with respect to properly presetting of the gap 202. Thus, as the system 200a is adapted to automatically change the width of the gap 202 between the deck plates 208a, 208b, the system 200a can adapted to changes in cross-sectional sizes for different crop types, which can further minimize header loss during harvesting.

Figure 7:
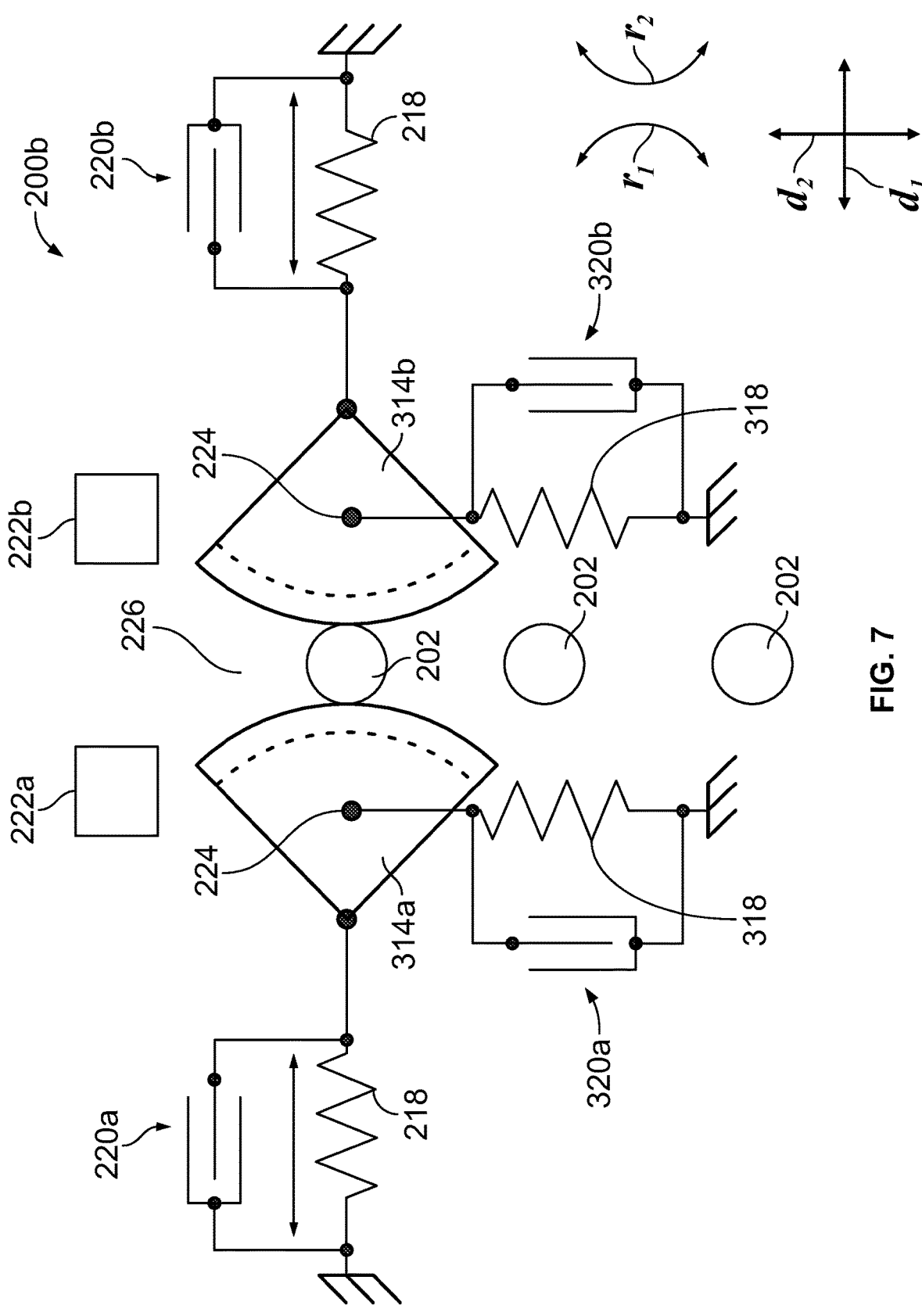
FIG. 7 illustrates a schematic representation of a portion of an exemplary crop stabilizer and measurement system.

FIG. 7 illustrates a schematic representation of a portion of another exemplary crop stabilizer and measurement system 200b. As seen, the illustrated embodiment, the stabilizers 314a, 314b have an arc, semi-circular, or segmented shape. Similar to the stabilizers 214a, 214b shown in FIG. 3, each stabilizer 314a, 314b in the embodiment shown in FIG. 7 can be coupled to a first biasing element 218, and the crop stabilizer and measurement system 200b can include the previously discussed first and second sensors 220a, 220b, 222a, 222b.

Additionally, each stabilizer 314a, 314b can be adapted to displaced along at least two axes of travel (as generally in indicated by "$d_1$" and "$d_2$" in FIG. 7), as well as in directions therebetween. For example, similar to the stabilizers 214a. 214b shown in FIG. 3, each stabilizer 314a, 314b can move along a first axis ("$d_1$") in either a generally inwardly or outwardly direction, and thus generally toward and away from each other or the adjacent row unit 108. Additionally, each stabilizer 314a, 314b can also move along a second axis ("$d_2$") generally in forward and backward direction with respect to at least the direction 105 of travel of the harvester 100, and thus generally in a direction parallel to each other or a centerline of the adjacent row unit 108. Further, according to certain embodiments, the second axes ($d_2$) can be generally perpendicular to the first axis ($d_1$).

With respect to displacement generally along the second axis ($d_2$), each stabilizer 314a, 314b can be coupled to a second biasing element 318. According to certain embodiments, the second biasing element 318 can be adapted to bias the stabilizers 314a, 314b in a forward direction along the second axis ($d_2$) that can coincide with the forward direction 105 of travel of the harvester 100, and, moreover can outwardly bias the stabilizers 314a, 314b in a direction generally toward the approaching stalk 202. Alternatively, or additionally, the second biasing element 318 can be adapted to limit the extent the associated stabilizer 314a, 314b can be rotated, and moreover, can prevent the stabilizer 314a, 314b from completing any full circle of rotation. Such control of the extent that the stabilizer 314a, 314b can be rotated can allow the stabilizer 314a. 314b to have a semi-circular, arced, or segmented configuration, as seen in FIG. 7, as a limited portion of the stabilizer can engage the stalk 202.

The crop stabilizer and measurement system 200b can also include a third sensor 320a, 320b associated with at least one of the stabilizers 314a, 314b. For example, as seen in FIG. 7, a third sensor 320a, 320b can be associated with each of the stabilizers 314a, 314b. Additionally, each third sensor 320a, 320b can, for example, detect either, or both, linear and rotational displacement of the associated stabilizer 314a, 314b. Thus, the third sensor 320a, 320b may, or may not, be similar to the types of sensor discussed above with respect to the first and second sensors 220a, 220b, 222a, 222b. As with the first and second sensors 220a, 220b, 222a, 222b, information obtained by the third sensor(s) 320a, 320b can be communicated to, and used by, the controller 302 in connection with determining a size of a crop, such as, for example, cross-sectional size of a stalk 202, in connection with a determination as to whether to adjust the width of the gap 204 between the deck plates 208a, 208b via operation of an actuator(s) 210, as previously discussed.

As the stalk 202 opens, and travels along, the space 226 between the stabilizers 314a, 314b, grip bodies 236 along the outer edge of the stabilizers 314a, 314b can be engaged the stalk 202. The grip bodies 236, as well as either, or both, the first and second biasing elements 218, 318, can assist in providing a force against the stalk 202 that can assist in securing or stabilizing the stalk 202 at least while a mea- surement of the stalk 202 is being attained via use of one or more of the sensors 220a, 220b, 222a, 222b, 320a, 320b. The engagement of the stalk 202 with the stabilizers 314a, 314b can also, again, provide a force sufficient to overcome a biasing force of at least the first biasing element 218 so as to outwardly displace at least the stabilizers 314a, 314b along the first axis (d₁). The extent or distance of such associated movement or displacement can be detected and measured by either, or both, the first and second sensors 220a, 220b, 222a, 222b. Additionally, such force can also overcome a biasing force of the second biasing element 318, thereby allowing the stabilizers 314a, 314b to either, or both, be rotatably displaced to a certain degree in a rotation direction (r₁, r₂) similar to that discussed above with respect to the embodiment shown in FIG. 3, and to be rearwardly displaced along the second axis (d₂). The extent or distance of such either, or both, rotational and linear displacement, for example, can also be detected or measured by the third sensor 320a. 320b. Again, the information obtained by any or all of the first, second, and third sensors 220a, 220b, 222a, 222b, 320a, 320b can be communicated to, and used by, the controller 302, as previously discussed.

Upon removal of the force associated with the travel of the stalk 202 through the space 226, the first and second biasing elements 218, 318 of each stabilizer 314a, 314b can return that stabilizers 314a, 314b to an initial position. Thus, the second biasing element 318 can reverse the rotational direction at which the stabilizers 314a, 314b had been rotated while the stalk 202 passed through the space 226. Again, the inclusion of the second biasing element 318 can assist in limiting the rotational displacement of the stabiliz- ers 314a, 314b associated with being engaged with the stalk 202 to an arc shaped travel pattern, and prohibit a full circular travel path.

Figure 8:
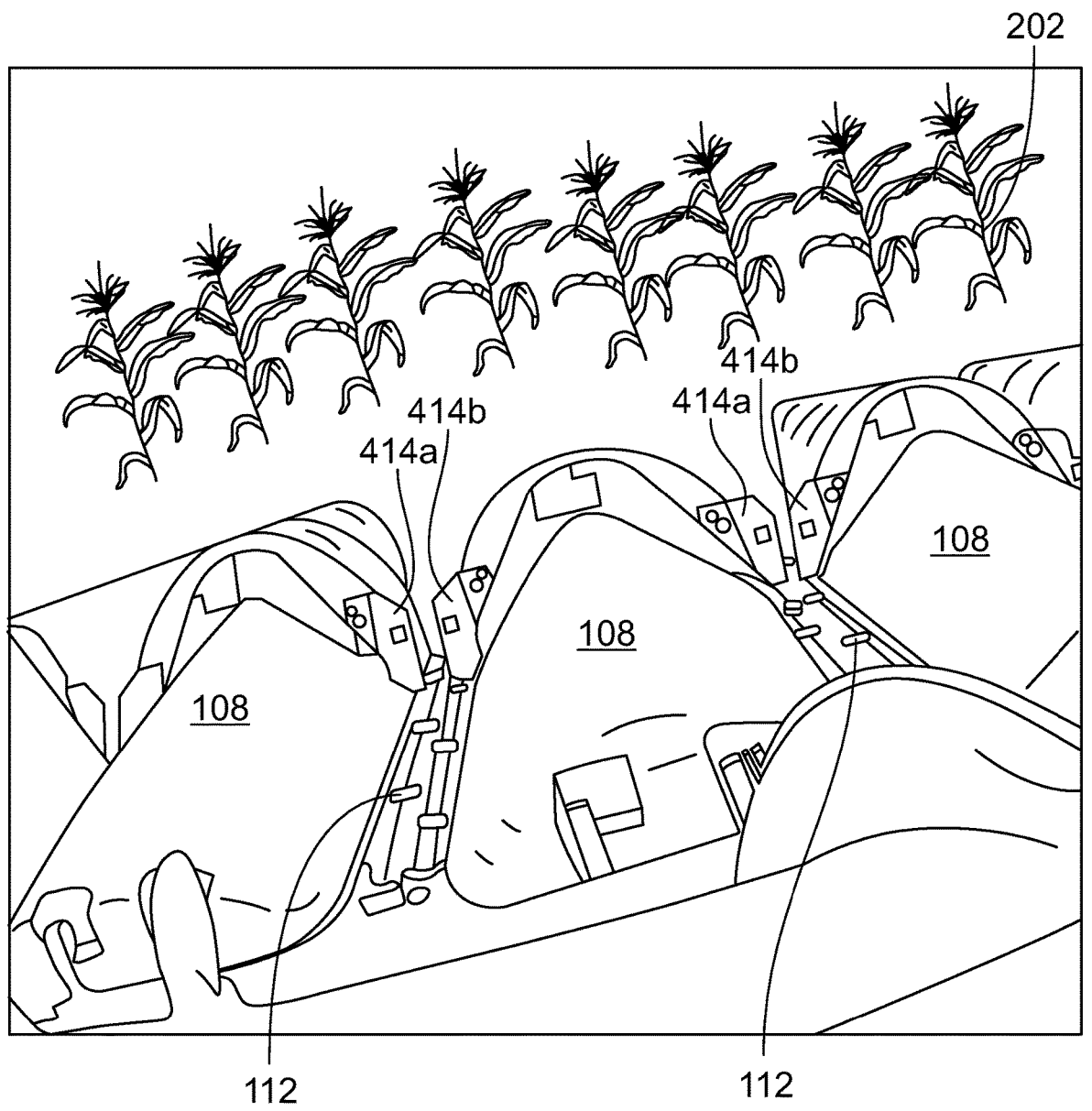
FIGS. 8 and 9 illustrate perspective views of a portion of an exemplary crop stabilizer and measurement system.
Figure 9:
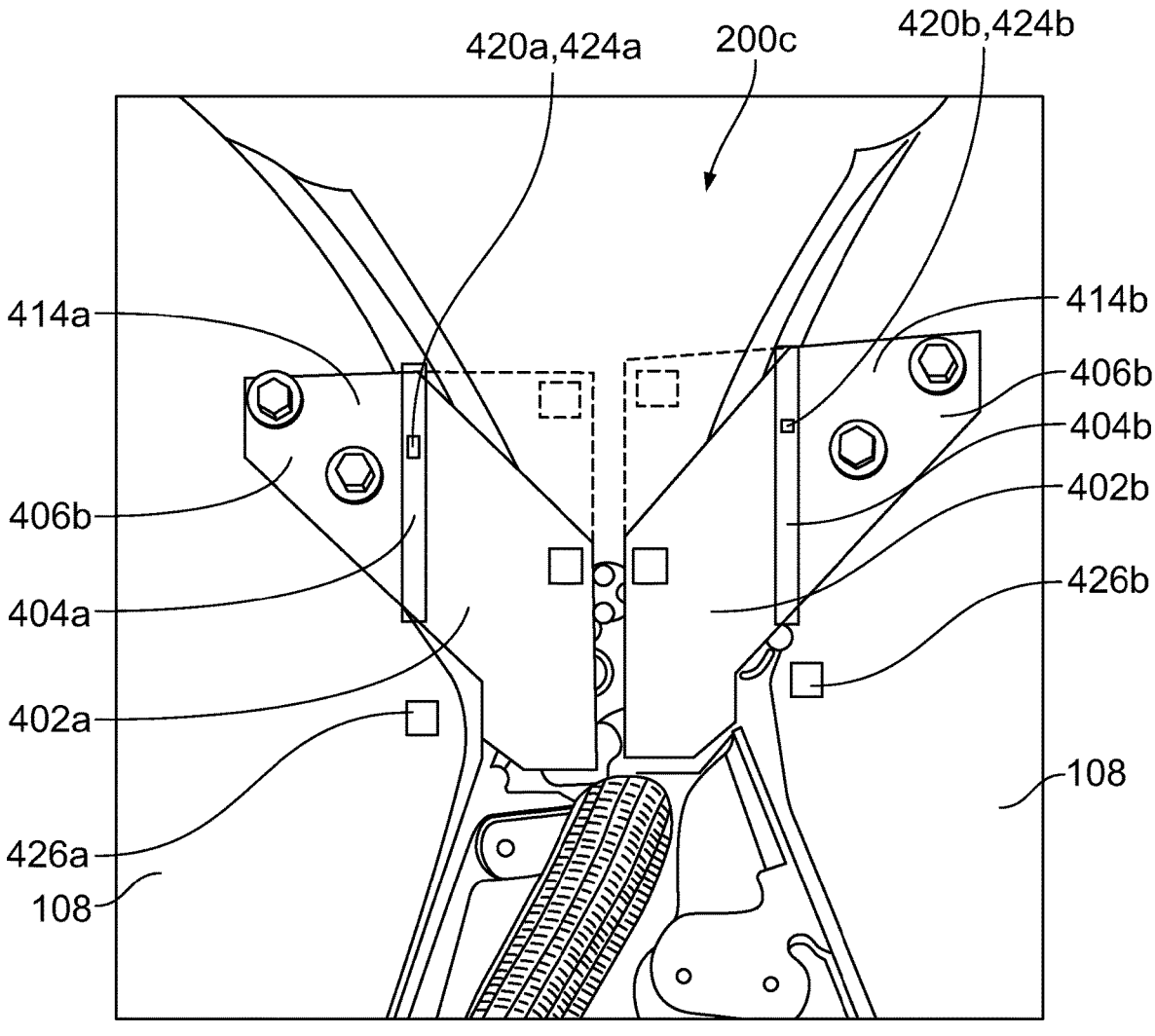

FIGS. 8 and 9 illustrate a schematic representation of a portion of another exemplary crop stabilizer and measure- ment system 200c. As shown, an adjacent pair of row dividers 108 each include a stabilizer 414a, 414b in the form of car loss inhibitors that are adapted to at least assist in determining or measuring a crop size, such as, for example, a cross-sectional size of a stalk 202. The stabilizers 414a, 414b can also assist with inhibiting crop loss, such as the loss of cars of corn or sunflowers, among others. In the example shown in FIG. 8, as the cornstalks move rearward of stabilizers 414a, 414b, a snapping roller or another mechanism removes the cars of corn from the stalks in the region where gathering chains 112 move. Thus, even if the cars of corn tend to bounce (for example if the harvester travels over uneven ground) once they are separated from the stalks, the stabilizers 414a, 414b are arranged to inhibit those cars from bouncing forward, and onto the ground. Instead, they will often contact the stabilizers 414a, 414b and remain in the area of gathering chain 112 so they are moved rearward toward the auger 110 for processing by the harvester 100.

As seen in FIG. 9, each of the stabilizers 414a, 414b can include a flap portion 402a, 402b, a rotating hinge or pivot portion 404a, 404b, and a mounting portion (or row divider mount) 406a, 406b. The mounting portions 406a, 406b can mount the stabilizers 414a, 414b at a location rearwardly of the snouts (leading edge) of the row dividers 108. In one example, the stabilizers 414a, 414b are mounted closely proximate (or even with) the front or leading part of the gathering chains 112. The stabilizers 414a, 414b can also be mounted slightly behind (or rearward of) the front part of gathering chains 112, among other locations Each of the stabilizers 414a, 414b can also include one or more first sensors 420a, 420b. The first sensor 420a, 420b can include a sense body 424a, 424b that can be incorpo- rated into the pivot portion 404a, 404b. According to certain embodiments, the sense body 424a, 424b can be adapted to sense the extent, or degree, at which the associated flap portion 402a, 402b is rotatably displaced. Thus, the sense body 424a, 424b can comprise, for example, a rotary encoder, among other types of sensors. According to certain embodiments, in operation, as harvester 100 engages a corn stalk 202, the corn stalk 202 passes between row dividers 108, and engages the flap portions 402a, 402b of the stabilizers 414a, 414b. Such engagement can result in rotat- able displacement of the flap portions 402a, 402b about the corresponding pivot portions 404a, 404b. As the flap por- tions 402a, 402b are pivoted at the pivot portions 404a, 404b, the sense body 424a, 424b can detect the extent of rotatable displaced of the associated flap portion 402a, 402b about the corresponding pivot portion 404a, 404b. Accord- ingly, a larger degree or extent of displacement of the flap portions 402a, 402b can be associated with a larger size, such as, cross-sectional size, of the portion of the stalk 202 that is engaging the flap portions 402a, 402b. Information obtained by each sense body 424a, 424b can be communi- cated to the controller 302 for determination of the associ- ated size, such as, for example, cross-sectional size, of the stalk 202. Further, such engagement between the pivotal flap portions 402a, 402b of the stabilizers 414a, 414b and the stalk 202 can assist in stabilizing or securing the stalk 202 to the stabilizers 414a, 414b in manner that can assist in attaining a relatively accurate measurement of a size, such as, for example, a cross-sectional size, of the stalk 202.

According to another embodiment, the first sensor 420a, 420b utilizes the strength of a signal received by a sense element 426a, 426b of the first sensor 420a, 420b from the sense body 424a, 424b, or vice versa, such as, for example, a strength of a received radio frequency (RF) signal, among other types of signals, to determine the extent at which the flap portion 402a, 402b is rotatably displaced via engage- ment with the stalk 202. Thus, the sense body 424a, 424b can, for example, be a passive radio frequency identifier that sends a response signal in response to receipt of a low- frequency, high-power RF signal from the sense element 426a, 426b. According to certain embodiments, spacing of the moveable sense body 424a, 424b relative to the rela- tively fixed sense element 426a, 426b can be determined using a Received Signal Strength Indication (RSSI), among other RF attributes relating to the signal received by the sense element 426a, 426b. The strength of the response signal that is received from the sense body 424a, 424b by the sense element 426a, 426b can provide an indication of the location of the sense body 424a, 424b, which can be used by the controller 302 to determine the associated size, such as, for example, the cross-sectional size, of the stalk 202. Alternatively, the first sensor 420a, 420b can be a proximity sensor in which the sense element 426a, 426b can detect either, or both, the proximity and changes in the proximity of the sense body 424a, 424b to the sense element 426a, 426b.

Figure 10:
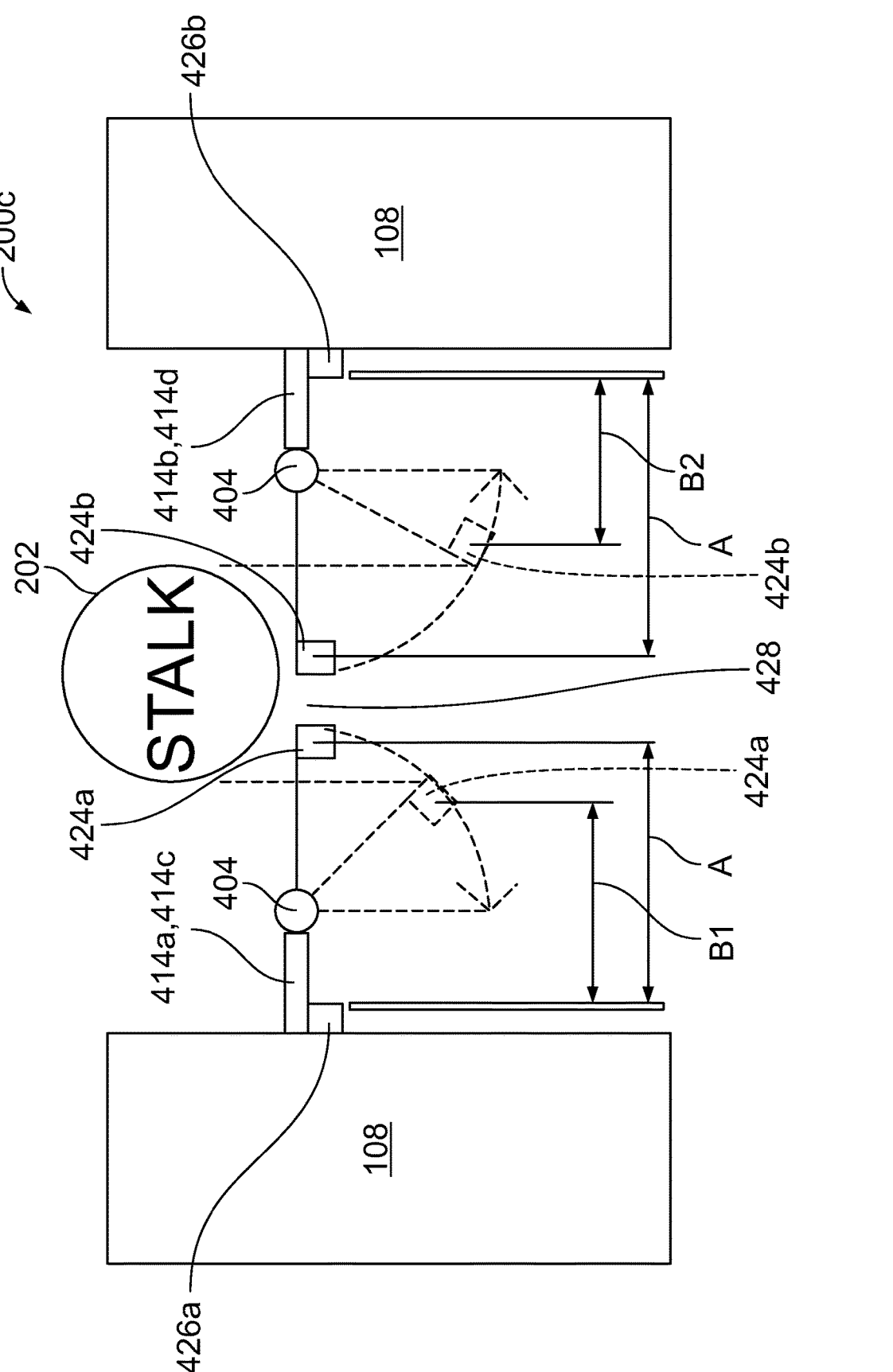
FIG. 10 illustrates a schematic representation of a portion of an embodiment of the exemplary crop stabilizer and measurement system shown in at FIG. 8.

FIG. 10 illustrates a schematic representation of a portion of an embodiment of the exemplary crop stabilizer and measurement system 200c shown in at FIG. 8 in which the sense elements 426a, 426b are fixedly secured to, or within, a corresponding row divider 108. Again, as illustrated, the moveable sense body 424a, 424b is mounted to the flap portions 402a, 402b of the stabilizers 414a, 414b, which, again, can be car inhibitors. Alternatively, a moveable sense body 424a, 424b can be mounted to stabilizers 414c, 414d that are in the form of paddles. Each stabilizer 414a, 414b, 414c, 414d can extend from one of a pair of adjacent row dividers 108 and into the area 428 between those row dividers 108. Each stabilizer 414a, 414b, 414c, 414d can be configured to be bent, pivoted, deformed, or deflected in response to engagement with a stalk 202 that enters into the area 428 between the row dividers 108. According to certain embodiments, such stabilizers 414c, 414d can also be utilized in determining whether the stalk 202, or other portions of the crop, is generally centrally aligned with the area 428 between the adjacent row dividers 108, which can be used in assisting the guidance of the harvester 100.

According to the illustrated example, in the absence of the stabilizers 414a, 414b 414c, 414d being in engagement with a stalk 202, the moveable sense body 424a, 424b can be at a first distance (as generally identified in FIG. 10 as "A") away from the corresponding sense element 426a, 426b. Upon full displacement of the stabilizers 414a, 414b 414c, 414d by engagement with the stalk 202, the sense body 424a, 424b can be displaced to a position at which the sense body 424a, 424b is at a second distance (as generally identified in FIG. 10 as "B1" and "B2" from the associated sense element 426a, 426b, the second distance being smaller than the first distance ("A"). Information regarding either, or both, of the second distances ("B1" and "B2") and differences between the first distance ("A") and the corresponding second distance ("B1" or "B2") can be obtained via use of the moveable sense body 424a, 424b and the sense element 426a, 426b, such as, for example, via a strength of a signal received by the sense element 426a, 426b from the sense body 424a, 424b, or via the sense element 426a, 426b and sense body 424a, 424b being operated to provide a proximity sensor. Such information can then be communicated to the controller 302 so as to determine the extent, if any, the width of the gap 204 between the deck plates 208a. 208b is to be adjusted, as previously discussed. For example, information obtained regarding the second distances ("B1" and "B2") can be used by the controller 302 to interrogate either, or both, the distance between the sense bodies 426a, 426b and the displaced portions of the stabilizers 414a, 414b 414c, 414d, which can thereby provide an indication of the corresponding size of the stalk 202 that is positioned therebetween. Such information can then be used by the controller 302 in connection with a determination as to whether to adjust the width of the gap 204 between the deck plates 208a, 208b via operation of an actuator(s) 210, as previously discussed.

Figure 11A:
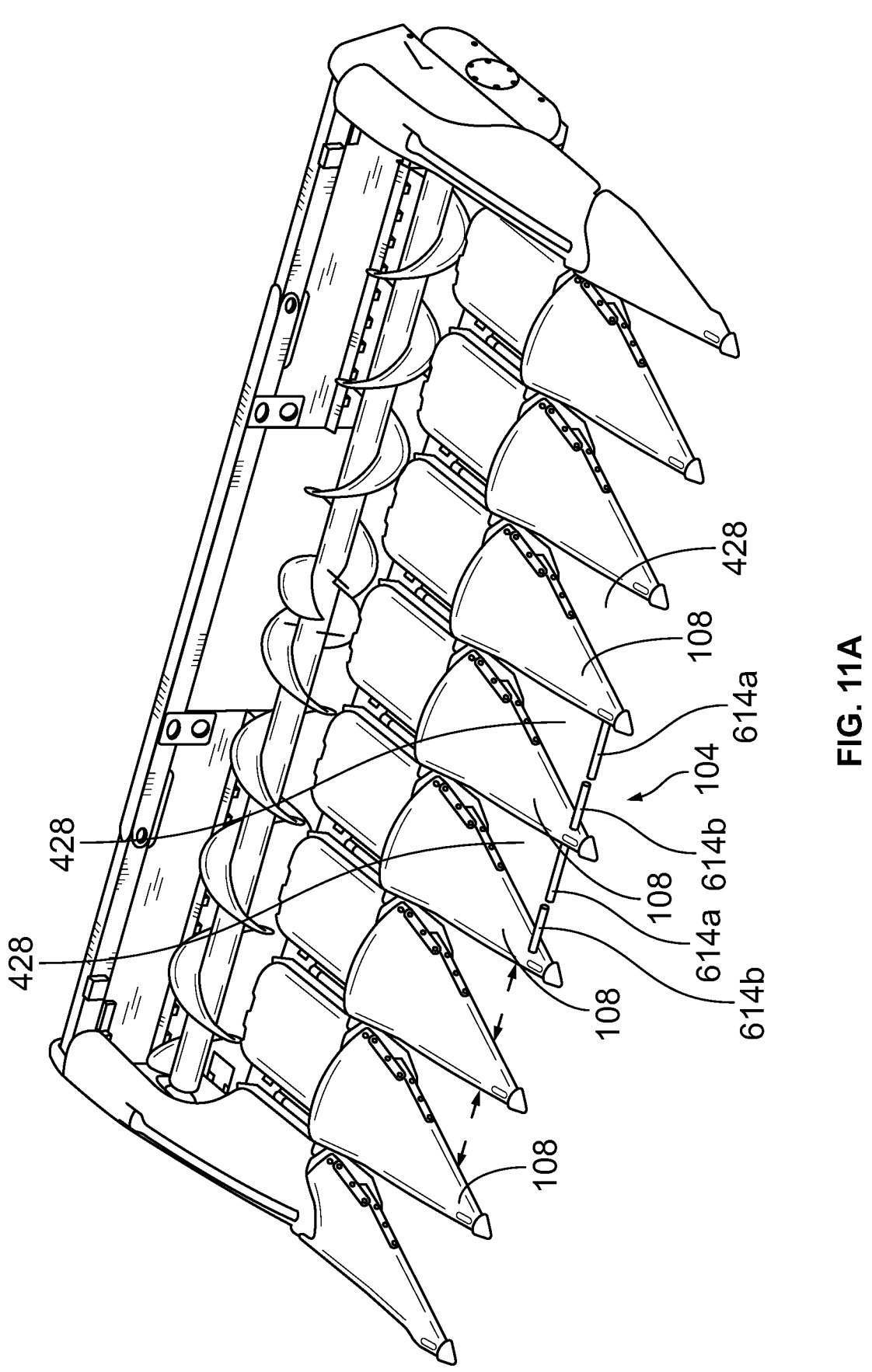
FIGS. 11A and 11B illustrate a portion of an exemplary crop stabilizer and measurement system.
Figure 11B:
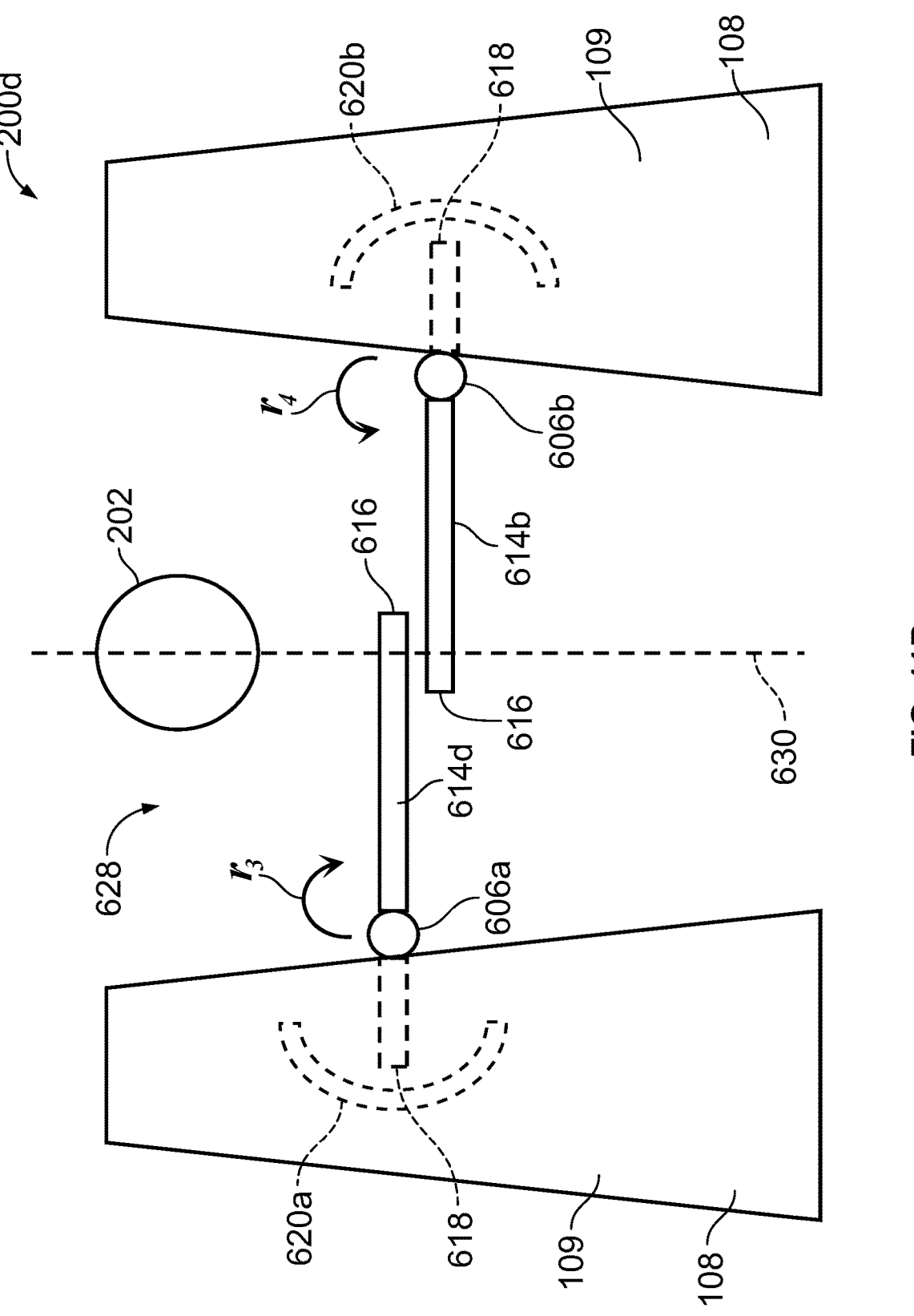

FIGS. 11A and 11B illustrate a schematic representation of a portion of an exemplary crop stabilizer and measurement system 200d. The crop stabilizer and measurement system 200d can include stabilizers 614a, 614b that can generally be similar to the paddles 414c, 414d discussed above with respect to FIG. 10. The stabilizers 614a, 614b can extend between a first end 616 and a second end 618 and can be mounted to an associated row unit 108 via a pivotal mounting portion 606a, 606b. At least the first end 616 can extend into the area 628 between those row dividers 108, while at least a portion of the second end 618 is at least partially housed within an interior area 109 within the associated row divider 108. Additionally, the stabilizers 614a, 614b are arranged in the area 628 between the adjacent row units 108 in an overlapping manner with respect to each other. Thus, as illustrated in at least FIG. 11B, each stabilizer 214a, 214b can extend over a centerline 630 of the area 628 between those row dividers 108. Such an overlapping configuration can assist in attaining positive stalk 202 engagement with the stabilizers 614a, 614b, and thus may overcome potential issues that could arise if the plant location of stalk 202 is off-center with respect to centerline 630 of the area 628 between those row dividers 108, or if the stalk 202 moves to an off center location during engagement with at least the stabilizers 614a, 614b. For example, such an overlapping arrangement can be beneficial in, among other instances, situations when the harvester 100 travels along relatively tough terrain that may otherwise make locating a centerline of the stalk, let alone obtain size associated size measurements of the stalk.

In response to engagement with the stalk 202 as the harvester 100 moves forward in the direction 105 of travel, the first stabilizer 614a can be rotated in a first direction (as generally indicated in FIG. 11B as "$r_3$"), such as, for example, a clockwise direction, while the second stabilizer 614b can rotate in a second, opposite direction, such as, for example, a counterclockwise direction (as generally indicated in FIG. 11B as "$r_4$").

Also included within the interior area 109 of the associated row dividers 108 is at least a first sensor 620a, 620b that is adapted to detect either, or both, the movement and the extent of movement of the adjacent stabilizer 614a, 614b, including, for example, movement at or around the second end 618 of the stabilizer 614a, 614b. The first sensor 620a, 620b can be similar to, as well as a combination of, the various types of sensors that are discussed above other embodiments of the crop stabilizer and measurement systems 200a through 200c, including, but not limited to, a proximity and position sensor. Additionally, compared to external environment in which the row divider 108 is exposed at least during operation of the harvester 100, the interior area 109 within row divider 108 can provide a relatively cleaner and generally protected space for the first sensor 620a, 620b. Accordingly, use of the interior area 109 for housing the first sensor 620a, 620b can allow for the use of a variety of other types of sensors, and combinations of different sensors for the first sensor 620a, 620b. For example, according to certain embodiments, the first sensor 620a, 620b can be an optical, inductive, or capacitive sensor, as well as combinations thereof, among other sensors.

Again, information obtained by the first sensors 620a, 620b can be used by the controller 302 in connection with a determination as to whether to adjust the width of the gap 204 between the deck plates 208a. 208b via operation of an actuator(s) 210, as previously discussed.

Figure 12:
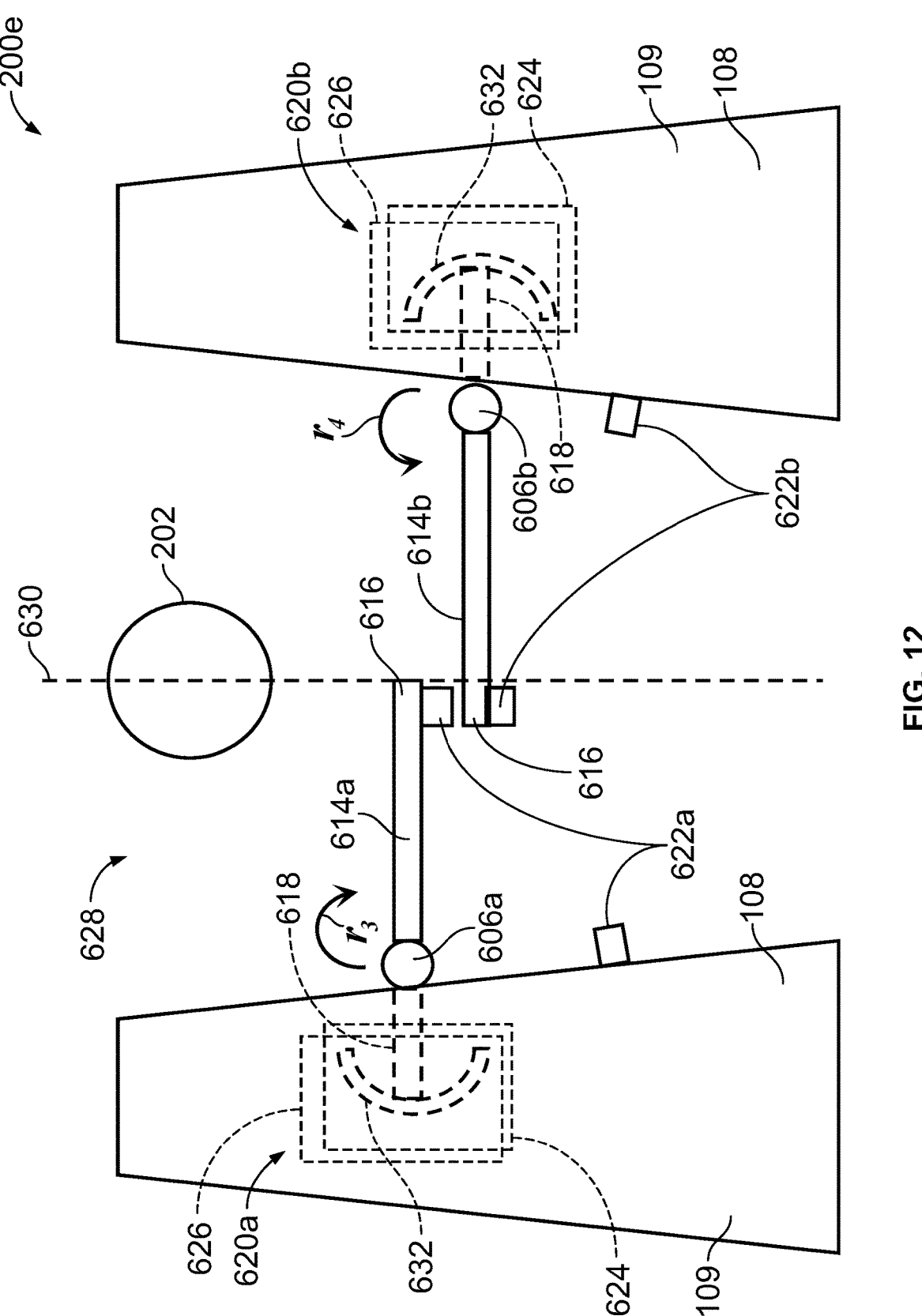
FIG. 12 illustrates a schematic representation of a portion of an exemplary crop stabilizer and measurement system.

FIG. 12 illustrates a schematic representation of a portion of another exemplary crop stabilizer and measurement system 200e. The system 200e shown in FIG. 12 is generally similar to the system 200d shown in FIGS. 11A and 11B. While the stabilizers 614A, 614B for the system 200e shown in FIG. 12 are also arranged in an overlapping manner, only one of the first and second stabilizers 614b extends over the centerline 630 of the area 628 between the adjacent row dividers 108. Additionally, the first sensor 620a, 620b that is positioned within the interior area 109 of the row dividers 108 is illustrated as a capacitive sensor that utilizes a pair of capacitive plates 624, 626. Further, the stabilizers 614A, 614B extend into, and are pivotally displaced within, both the area 628 between the row dividers 108 and the interior area 109 of the row dividers 108. Thus, for example, at least a first end 616 of the stabilizers 614A, 614B can be positioned in the area 628 between the adjacent row dividers 108, and a second end 618 of the stabilizers 614A, 614B can be positioned within the interior area 109 of the row dividers 108. Accordingly, engagement of the stabilizers 614A, 614B with a stalk 202 can facilitate pivotal displacement of at least the first and second ends 616, 618 of the stabilizers 614A, 614B.

Accordingly, the stabilizers 614A, 614B can be pivotally coupled to, and possibly within, the row dividers 108 by an associated mounting portion 606a, 606b.

According to certain embodiments, in a single mode operation of the first sensor 620a, 620b, a first capacitive plate 624 can be coupled to the second end 618 of the stabilizer 214a, 214b or another portion of the stabilizer 614a, 614b that is positioned within the interior area 109 of the row divider 108. Further, via the pivotal displacement of the associated stabilizer 614a, 614b, the first capacitive plate 624 is moveably displaceable over the second capacitive plate 626, which, relative the pivotal movement of the first capacitive plate 624, can be relatively stationary. According to such an embodiment, changes in capacitance can occur via changes in the parallel plate area (e.g. C=εA/d, where C is capacitance, ε is permittivity, A is parallel plate area, and d is the distance between the two conductive capacitance plates 624, 626).

Alternatively, the first sensor 620a, 620b can operate in a dual mode in which the first and second capacitive plates 624, 626 remain relatively stationary with respect to each other. A sense element 632 of the first sensor 620a, 620b that is constructed from a passive dielectric material can be coupled to the second end 618 of the stabilizer 614a, 614b, or to another portion of the stabilizer 614a, 614b that is housed within the interior area 109 of the row divider 108. Further, the sense element 632 can be positioned between the first and second capacitive plates 624, 626. According to such embodiment, displacement of the sense element 632 within the area between the first and second capacitive plates 624, 626 via pivotal displacement of the associated stabilizer 214a, 214b can alter the permittivity (8), thereby causing an associated change in capacitance that is detected by the first sensor 620a, 620b.

Additionally, the crop stabilizer and measurement system 200e shown in FIG. 12 can also have one or more second sensors 622a, 622b, at least a portion of which can be mounted at or around the first end 616 of the stabilizers 614a, 614b, or positioned for displacement within the area 628 between the adjacent row dividers 108. According to certain embodiments, the second sensors 622a, 622b can be similar to the sensors 422a, 422b discussed above with respect to FIGS. 8-10, and can be, for example, proximity sensors or sensors utilized to detect signal strength, as well as combinations thereof, as previously discussed.

Information obtained by the first sensors 620a, 620b regarding either, or both, capacitance levels, /or changes in the measured capacitance, and information obtained by the second sensors 622a, 622b can be communicated to, and use by, the controller 302 in connection with a determination as to whether to adjust the width of the gap 204 between the deck plates 208a, 208b via operation of an actuator(s) 210, as previously discussed.

As discussed below with respect to FIGS. 13A through 19, according to certain embodiments, the stabilizers of certain crop stabilizer and measurement systems 200f through 200k can have a deformation body 702, as shown, for example, in FIGS. 13A through 13D. According to certain embodiments, the deformation body 702 is constructed from a deformable material, including but not limited to, a compliant gel or a memory shape material, including, but not limited to, a viscoelastic polyurethane foam or a low-resistance polyurethane foam, or is provided in the form of a shape compliant assembly. According to other embodiments, the deformation body 702 is constructed from a metallic material arranged to have spring like characteristics or shape recovery. With such embodiments, one or more sensors can be utilized to detect characteristics relating to a deformation, movement, or shape changes, as well as combinations thereof, among other characteristics, in the deformation body 702 resulting from engagement with the crop, such as, for example, with the stalk 202.

The deformation body 702 can accommodate at least temporary deformation of shape or configuration of the stabilizers during, or for at least a period of time following, contact with the crop, such, as, for example, the stalk 202. Such deformation or shape changes of the deformation body 702 can assist in physically the stabilizers in securing or stabilizing the stalk 202 so that a relatively accurate measurement of a size of the stalk 202 can be obtained. Further, the shape, size, and extent of such deformation of the stabilizers can be detected by one or more sensors of the systems 200f through 200k, and communicated to the controller 302, as discussed above. Similar to the previously discussed embodiments, the controller 302 can utilize such information from the sensors to determine or measure a size, such as, for example, a cross-sectional size, of the stalk 202. Thus, sensors utilized by the systems 200f through 200k can include, but are not limited to, proximity sensors, movement sensors, strain gauges, optical sensors, transducers, piezo-electric sensors, fiber optic light sensors, a pressure sensors, among others. Using at least such a determined size, the controller 302 can further determine whether the position of one or more deck plates 208a, 208b, as well as other components of the header 104, are to be adjusted so as to accommodate the size of the stalk 202. Thus, according to certain embodiments, based on at least the measured size of the stalk 202, the controller 302 can, via selective operation of one or more actuators 210, facilitate an automatic adjustment in the width of the gap 204 between the deck plates 208a, 208b, among other changes to the header 104. The subsequent shape recovery of the deformation body 702 can be attained in a variety of manners, including, for example, via a thermal responsive, electrical activation, application of a mechanical force(s), as well as, if applicable based on the deformable material of the deformation body 702, via the elasticity properties of the associated deformable material.

Figures 13A, 13B, 13C, 13D:
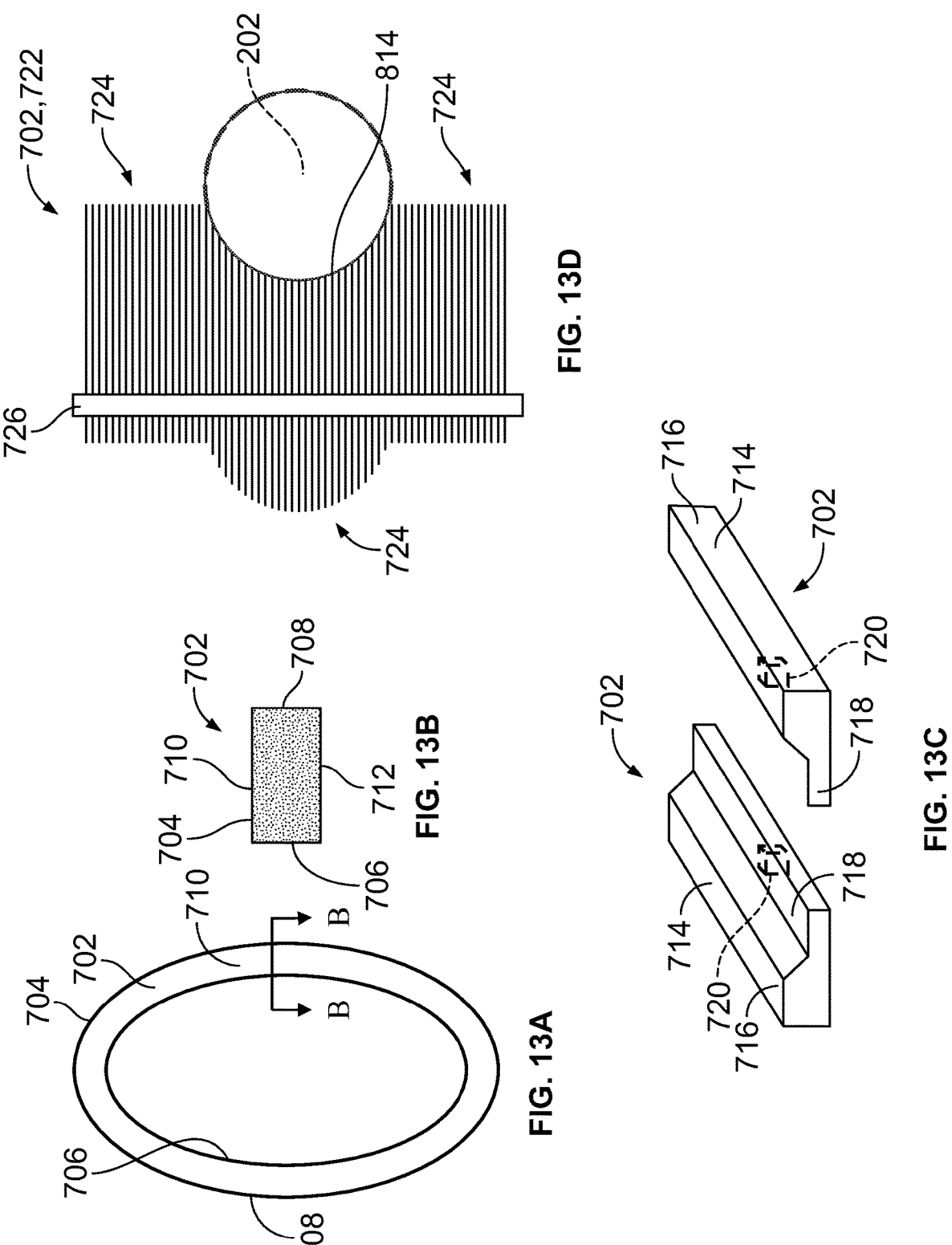
FIG. 13A illustrates a top view of a deformable body of a stabilizer in the form of a hose or belt.
FIG. 13B illustrates a cross sectional view taken along line B-B in FIG. 13A.
FIG. 13C illustrates a side perspective view of a deformable body of a stabilizer in the form of a brush or pad.
FIG. 13D illustrates a top view of a deformable body in the form of a shape compliant assembly.

FIGS. 13A and 13B illustrate an exemplary embodiment of a deformation body 702 for a stabilizer that includes a compliant gel or a memory shape material, among other deformable materials. As seen in FIGS. 13A and 13B, according to certain embodiments, the deformation body 702 can have a hose or belt configuration wherein the deformation body 702 may, or may not, include an outer substrate 704 to encapsulate the deformable material of the deformation body 702. In the illustrated embodiment, the deformation body 702 can include an inside portion 706 and an opposing outside portion 708 and can extend between opposing upper and lower surfaces 710, 712.

FIG. 13C illustrates another embodiment of a deformation body 702 configured as a pad 714, but which could also be configured as a brush. According to the illustrated embodiment, the pad 714 can include a support portion 716 and a pad portion 718. The support portion 716 can be configured to be secured to a support plate or other bodies that may accommodate securing the pad 714 to other components of the harvester 100, including for example, to a gathering chain 112. The pad portion 718 can be adapted to come into engagement with a portion of a crop, such as, for example, a stalk 202, such that the engaged portion of the pad portion 718 is deformed or otherwise displaced in the area of the engagement with the stalk 202 such that the stalk 202 imparts, at least temporarily, an imprint or depression that corresponds to the shape and size of at least a portion of the stalk 200 into the pad portion 718.

As seen in FIG. 13C, according to certain embodiments, one or more sensors 720 can be embedded into the material of the deformation body 702 that can detect characteristics relating to engagement between the deformation body 702 and the crop, or relating to an imprint that can be imparted into or onto the deformation body 702 via engagement with the crop. Various different types of sensors can be utilized as the embedded sensor(s) 720, including, but not limited to, either, or both, movement, proximity and pressure sensors, among others. The selection of type of sensor utilized as the embedded sensor 720 can be based at least in part on the type of characteristic that is to be detected in connection with determining a corresponding size of the crop, such as, for example, a cross-sectional size of a stalk 202. For example, according to certain embodiments, an embedded sensor(s) 720 can be utilized to detect movement, which can include one or more of the distance, degree, and extent of movement, of at least a portion of the deformation body 702 relating to the area at which the crop provided an imprint in the deformation body 702. Additionally, or alternatively, the embedded sensor(s) 720 can detect pressure, or changes in pressure, in the deformation body 702 caused by engagement between the crop, such, as for example, the stalk 202, and the deformation body 702. Again, information obtained via use of the embedder sensor(s) 720 can be communicated to the controller 302 in connection with determining a corresponding size of the crop and whether to actuate an actuator(s) 210 to adjust the size of the width of the gap 204 between the deck plates 208a, 208b, as previously discussed.

According to other embodiments, the deformation body 702 can comprise a shape compliant assembly 722, as illustrated in FIG. 13D, such as, for example, a contour gauge, that comprises a plurality of displaceable bodies 724, such as, for example, pins, that are secured, and at least be generally linearly displaceable relative, to a frame 726 of the shape compliant assembly 722. Thus, upon at least some of the displaceable bodies 724 becoming engaged with the stalk 202, those engaged displaceable bodies 724 are at least displaceable relative to the frame 726 by a distance that can generally correspond to an associated size and outer shape of the portion of the stalk 202 to which those displaceable bodies 724 are, or were, engaged. For example, as illustrated, the stalk 202 can impart, or otherwise at least temporarily leave, and imprint 814 along at least a portion of a collection of adjacent displaceable bodies 724 that corresponds to the size and shape of the stalk 202. Sensors, including, but not limited to movement and proximity sensors, among others, can be utilized to detect either, or both, the movement and extent of movement of the engaged displaceable bodies 724, as well as or features of the imprint 814, with the sensed information again being provided to the controller 302, as previously discussed. Further, according to certain embodiments, the shape compliant assembly 722 can configured to provide a brush having a configuration similar to that shown in FIG. 13C, wherein the pad portion 718 of the brush or pad 714 can comprise the displaceable bodies 724 and the support portion 716 can comprise the frame 726.

While the embodiments discussed below are directed to particular exemplary embodiments that utilize deformable materials or bodies, the below disclosures are also applicable to, or can be incorporated into, the previously discussed embodiments, including, for example, the embodiments discussed above with respect to at least FIGS. 3 and 6A through 12.

Figure 14:
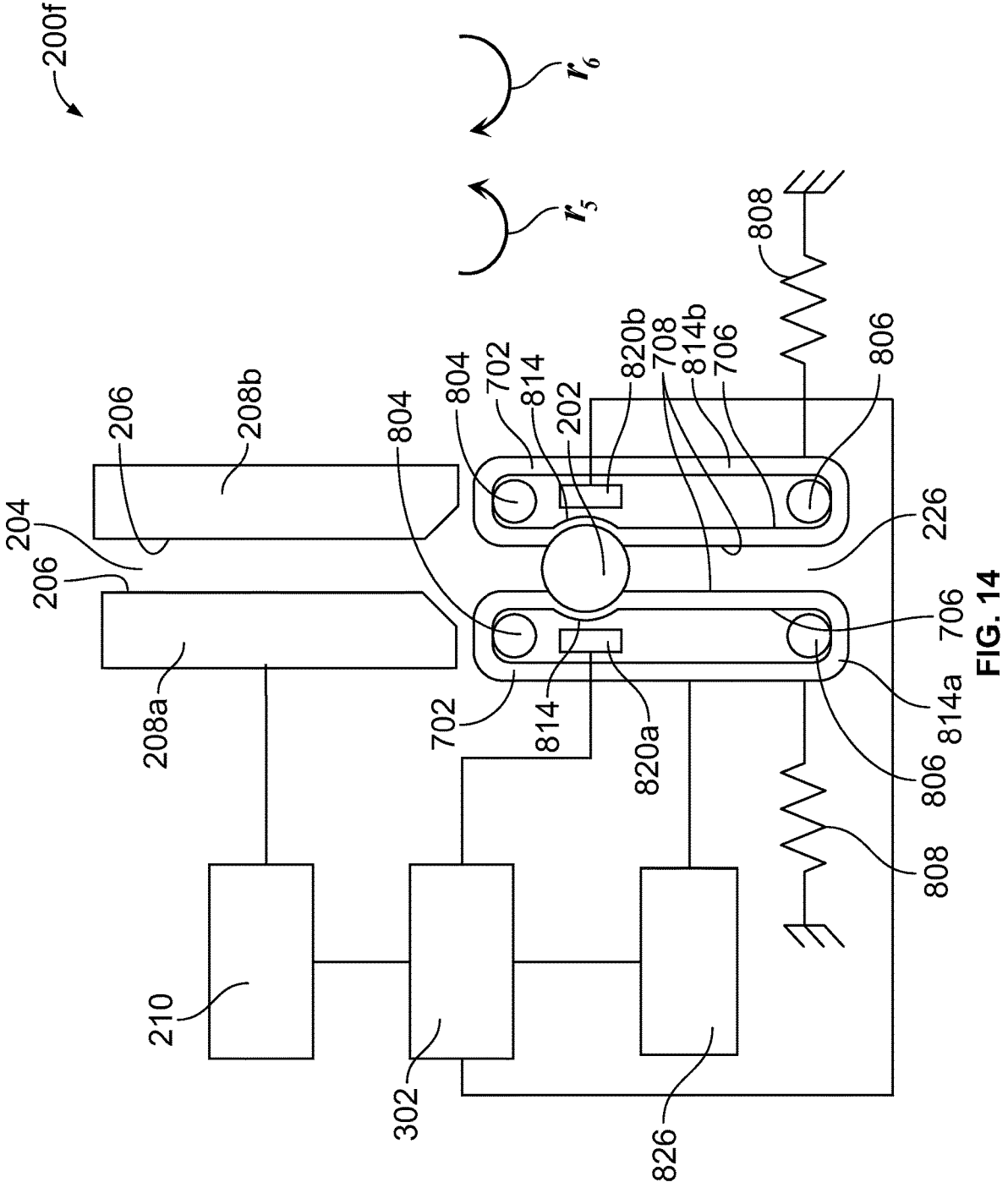
FIG. 14 illustrates a schematic representation of a portion of an exemplary crop stabilizer and measurement system.

FIG. 14 illustrates a schematic representation of a portion of an exemplary crop stabilizer and measurement system 200f that utilizes a pair of deformable stabilizers 814a, 814b. As seen, one or both of the stabilizers 814a, 814b can include a deformation body 702 configured either as a hose or foam belt (FIGS. 13A and 13B), or a foam pad or brush (FIG. 13C) that is at least partially constructed from a deformable or memory shape material. Further, the deformation body 702 or other portion of the stabilizers 814a, 814b can be coupled to a first roller 804 and a second roller 806 that can accommodate rotational displacement of the deformation a body 702 or other portion of the first stabilizer 814a in a first, counterclockwise direction (generally indicated by "$r_5$" in FIG. 14), and rotational displacement of the deformation body 702, or other portion of the second stabilizer 814b in a second, counterclockwise direction (generally indicated by "$r_6$" in FIG. 14). Further, according to certain embodiments, such rotational displacement can occur via engagement of the first second and stabilizers 814a, 814b with the stalk 202 as the harvester 100 travels in the forward direction 105 of travel. Alternatively, according to other embodiments, one or both of the first and second rollers 804, 806 can be coupled to a driver, such as, for example, a motor, that can be used to provide a force to rotate either, or both, the first and second rollers 804, 806 at a speed that is anticipated to correspond to a speed at which the harvester 100 is traveling in the forward direction 105 or at which the gathering chains 112 are operating. According to certain embodiments, each pair of rollers 804, 806 can be set apart by a distance of, for example, about 3 inches, among other distances.

According to certain embodiments, prior to engagement of the first and second stabilizers 814a, 814b with the stalk 202, generally adjacent and opposing portions of the deformation body 702 can be in contact with, or otherwise in relatively close proximity to each other. For example, similar to the embodiment discussed above with respect to at least FIG. 3, one or more biasing elements 808 can be coupled to one or both of the first and second stabilizers 814a, 814b so as to inwardly bias the first and second stabilizers 814a, 814b into contact with, or into relatively close proximity to, each other.

Thus, according to embodiments which incorporate one or more biasing element(s) 808, as the stalk 202 engages with the first and second stabilizers 814a. 814b, a space 226 between the first and second stabilizers 814a, 814b can open, or a width of the space 226 there between can increase. Thus, according to certain embodiments, the force provided by the stalk 202 against the first and second stabilizers 814a, 814b can at least partially overcome the biasing force of the biasing element(s) 808 so as to outwardly displace one or both of the first and second stabilizers 814a, 814b, a space 226, thereby increasing the width of the space 226 therebetween.

As the stalk 202 enters or travels along the space 226 between the first and second stabilizers 814a, 814b, and engages at least an outside portion 708 of the deformation body 702, the force provided by the stalk 202 against the deformation body 702 of either, or both, the first and second stabilizers 214a, 214b can result in deformation of the deformation body 702, as indicated in FIG. 14 by an imprint 814 in the deformation bodies 702. Such deformation of the deformation bodies 702 can assist in physically securing or stabilizing the stalk 202 in the system 200f so as to assist in obtaining a relatively accurate of the measurement of the cross-sectional size of the stalk 202. Further, according to certain embodiments, the first and second stabilizer 214a, 214b can be set or positioned to have a space 226 therebetween that has a width that is less than the anticipated cross-sectional size of the stalk 202 that will pass therethrough. For example, according to certain embodiments, the space 226 can have a width that is approximately one-half the anticipated cross-sectional size of the stalk 202.

According to the illustrated embodiment shown in FIG. 14, while the imprint 814 is still engaged with the stalk 202, an inner side the imprint 814 at the inside portion 706 of the deformation body 702 can pass by a first sensor 820a, 820b of the crop stabilizer and measurement system 200f, the inside and outside portions 706, 708 being opposing sides of the deformation body 702. Thus, according to such embodiments, the deformation body 702 can have a width between the opposing inside and outside portions 706, 708 of the deformation body 702 such that, at the imprint 814, deformation of the outside portion 708 can be accompanied by deformation of the inside portion 706 of the deformation body 702.

The first sensor 820a, 820b can be adapted to detect a degree or extent of deformation of the deformation body 702 at the imprint 814, or detect either, or both, a size and shape of the deformation occurring at the imprint 814. Thus, for example, the first sensor 820a, 820b can be used to measure the contour dimensions of the of the deformation body 702 along at least a portion of the imprint 814, with such information again being provided to the controller 302 in connection with determining the cross-sectional size of the stalk 202 in connection with a determination of whether the actuator(s) 210 is to adjust the width of the gap 204 between the deck plates 208a, 208b.

According to the embodiment depicted in FIG. 14, the first sensor 820a, 820b is positioned adjacent to an inside portion 706 of the deformation body 702 at a location at which the first senor 820a, 820b can detect information regarding the deformation of the deformation body 702 while the deformation body 702 is engaged with deformation body 702 at the imprint 814. Thus, according to such an embodiment, the first sensor 820a, 820b can detect sizes, contours, or shapes, as well as combinations thereof, among other information, at least along the inside portion 706 of the deformation body 702 that corresponds to the location of the imprint 814.

Figure 15:
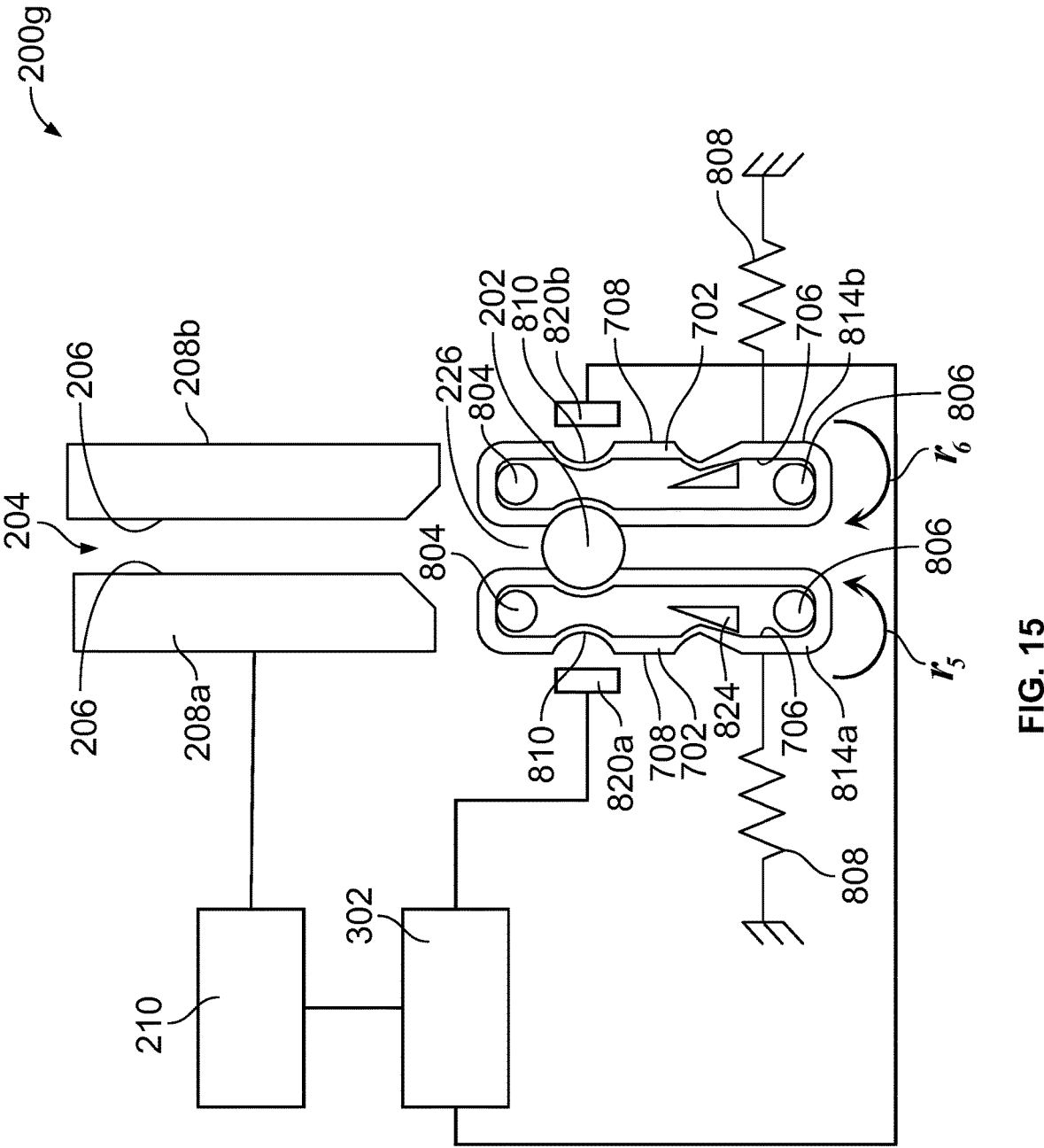
FIG. 15 illustrates a schematic representation of a portion of an exemplary crop stabilizer and measurement system.

Alternatively, FIG. 15 discloses another, similar embodiment of the system 200g in which the first sensor 820a, 820b is positioned to detect characteristics relating to the deformation of the deformation body 702 caused by the stalk 202 after the stalk 202 has disengaged at least at a location along the outside portion 708 of the deformation body 702. As seen, the first sensor 820a, 820b can be positioned adjacent to sense characteristics relating to outside portion 708 of the deformation body 702 at the location of the imprint 810. Additionally, according to certain embodiments, at least a portion of the deformation body 702 that is adjacent to the first sensor 820a, 820b, as well as the first sensor 820a, 820b, can be positioned within the relatively clean interior area 109 of the row divider 108, which can accommodate use of a wide variety of the sensor types for the first sensor, including those discussed above with respect to other embodiments of the systems 200a through 200f. Additionally, or optionally, according to other embodiments, a combination of the first sensors 820a, 820b shown in FIGS. 14 and 15 can be utilized together to provide information relating to different sides of the imprint 810 that can be by the controller 302 to determine the cross-sectional size of the stalk 202.

FIGS. 14 and 15 also illustrate exemplary manners in which shape recovery or shape restoration of the deformation body 702 at least at the location of the imprint 814 can be attained. For example, referencing FIG. 14, the controller 302 can control the operation of a heat or power source 826 that can provide an energy in the form of either, or both, heat and electricity to activate or quicken shape recovery of the deformation body 702 at least at the location of the imprint 814. Additionally, FIG. 15 provides an exemplary embodiment in which at least a recovery body 824, such as, for example a block, can have a round, ramped, or inclined wall that can be positioned to engage with an inside portion 706 of the deformation body 702 so as to at least outwardly push, deflect, or press the deformation body 702 at least at the imprint 814 so as to facilitate shape recovery of the deformation body 702. Such attempts at shape recovery can also be utilized to supplement the shape recovery abilities of the deformation body 702 that can be attributed to the elastic properties of the deformation material of the deformation body 702.

Figure 16:
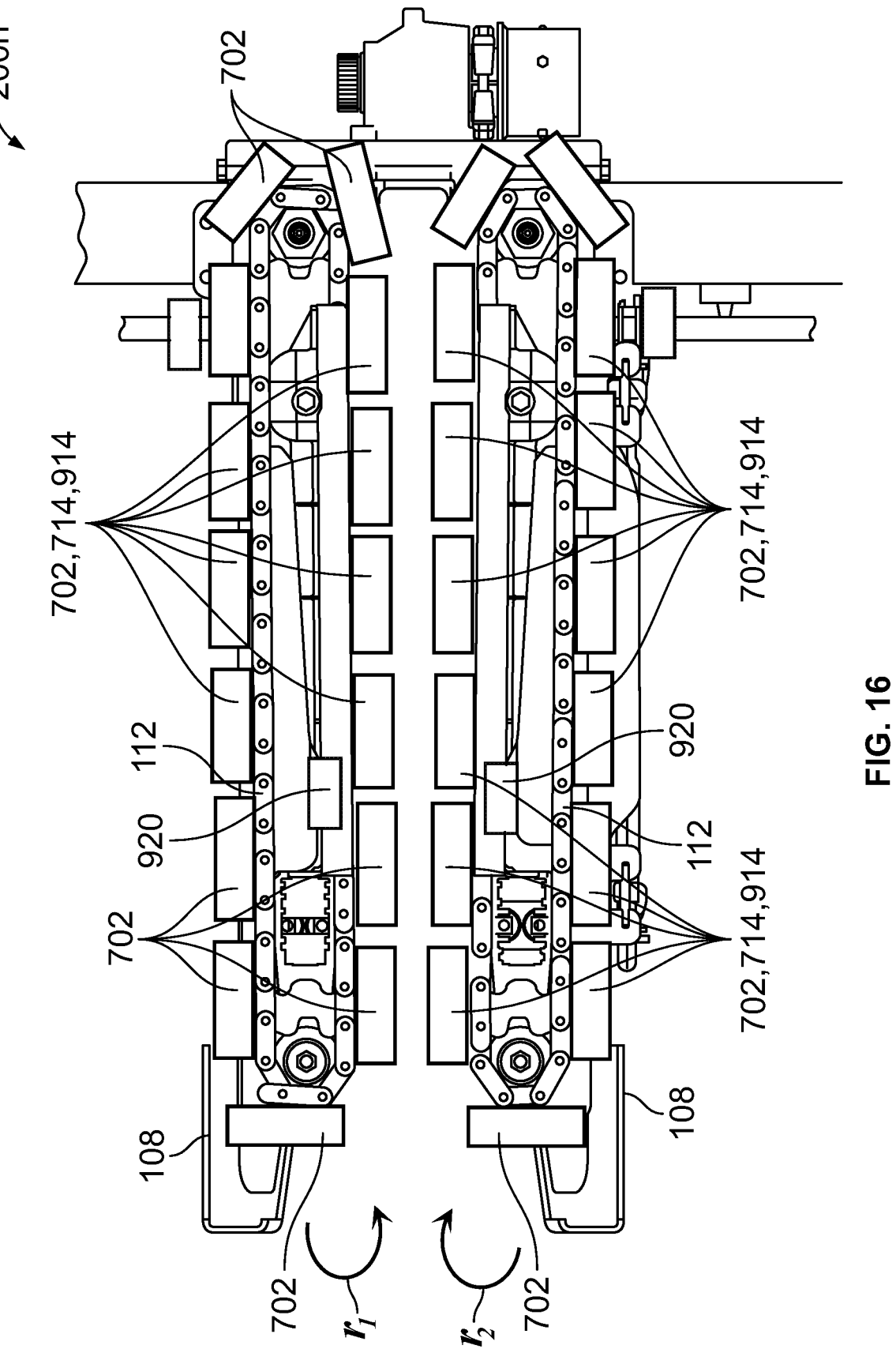
FIG. 16 illustrates a bottom view of a portion of an exemplary crop stabilizer and measurement system.

FIG. 16 illustrates a bottom view of a portion of an exemplary crop stabilizer and measurement system 200h in which a plurality of stabilizers 914 are secured to, and rotatably displaceable with, a plurality of gathering chains 112, as generally indicated by the directions of rotation ($r_1$ and $r_2$) in FIG. 16. According to such an embodiment, the stabilizers 914 can have a deformation body 702 comprising a foam brush or pad 714, as illustrated for example, in FIGS. 13C and 13D. According to certain embodiments, a sensor 920 similar to the sensors 820a, 820b discussed above with respect to FIG. 14 can be positioned to detect the size of the stalk 202, such as, for example, the cross-sectional size, via obtaining a measurement or other information from the inner or outer sides 706, 708 of the imprint 810 along the brush or pad 714. Alternatively, or additionally, according to certain embodiments, a sensor 920 similar to the sensor 820a, 820b discussed above with respect to FIG. 15 can be positioned to detect the size of the stalk 202, such as, for example, the cross-sectional size, via obtaining a measurement or other information of the imprint 810. Additionally, according to certain embodiments, the brush or pad 714 can utilize an imbedded sensor similar to the embedded sensor 720 discussed above to detect characteristics associated with the imprint 810.

Additionally, according to certain embodiments, the ability of the deformation bodies 702 of the stabilizers 914 to adapt to the shape of the stalk 202, and thereby stabilize the stalk 202, as well as provide associated support, as the harvester 100 travels in the forward direction 105 can allow for the elimination of the deck plates 208a, 208b. Thus, according to certain embodiments, the deformable stabilizers 914, including stabilizers 914 that are secured to the gathering chains 112, can allow for the removal, or non-use or non-inclusion, of deck plates 208a, 208b.

Figures 17A, 17B:
FIGS. 17A and 17B illustrate perspective views of a portion of an exemplary crop stabilizer and measurement system having stabilizers in the form of stalk rolls.

FIG. 17A illustrates a perspective view of a system 200i that includes stabilizers 914a, 914b in the form of a stalk rolls according to an embodiment of the subject disclosure. As shown in FIG. 17B, the illustrated stabilizers 914a, 914b can include a first, fluted portion 902 of the stabilizers 914a, 914b and a second, body portion 904 coupled to the fluted portion 902. As seen, the fluted portion 902 can include one or more helical threads adapted to, as the stabilizer 914a, 914b rotates, guide and pull the stalk 202 down through a gap between adjacent deck plates 208a, 208b so that corn ears can be pulled from the stalk 202. According to the illustrated embodiment, the fluted portion 902 of one or more stabilizers 914a, 914b of the system 200i can be provide a deformable stabilizer 914a, 914b. Moreover, the fluted portion 902 of the stabilizers 914a, 914b can be a deformation body 702 that is constructed, for example, a deformation body 702 constructed from a deformation foam or gel, among other deformable materials and constructions.

As with other deformable embodiments disclosed herein, engagement of the deformable fluted portion 902 with the stalk 202 can result in an imprint 810 being imparted on the fluted portion 902. One or more sensors similar to those discussed above with respect to FIGS. 14 and 15 can be utilized to sense one or more of a size, shape, or contour characteristics of the imprint 810, among other characteristics regarding the imprint 810 or associated deformation of the fluted portion 902. Additionally, or alternatively, the fluted portion 902 can utilize one or more sensors that are embedded in the fluted portion 902 that is/are similar to the embedded sensor 720 discussed above with respect to FIG. 13C. Such sensed information can then be provided to the controller 302 in connection with determining a size, such as, for example, cross-sectional size, of the stalk 202, as previously discussed.

Figures 18A, 18B:
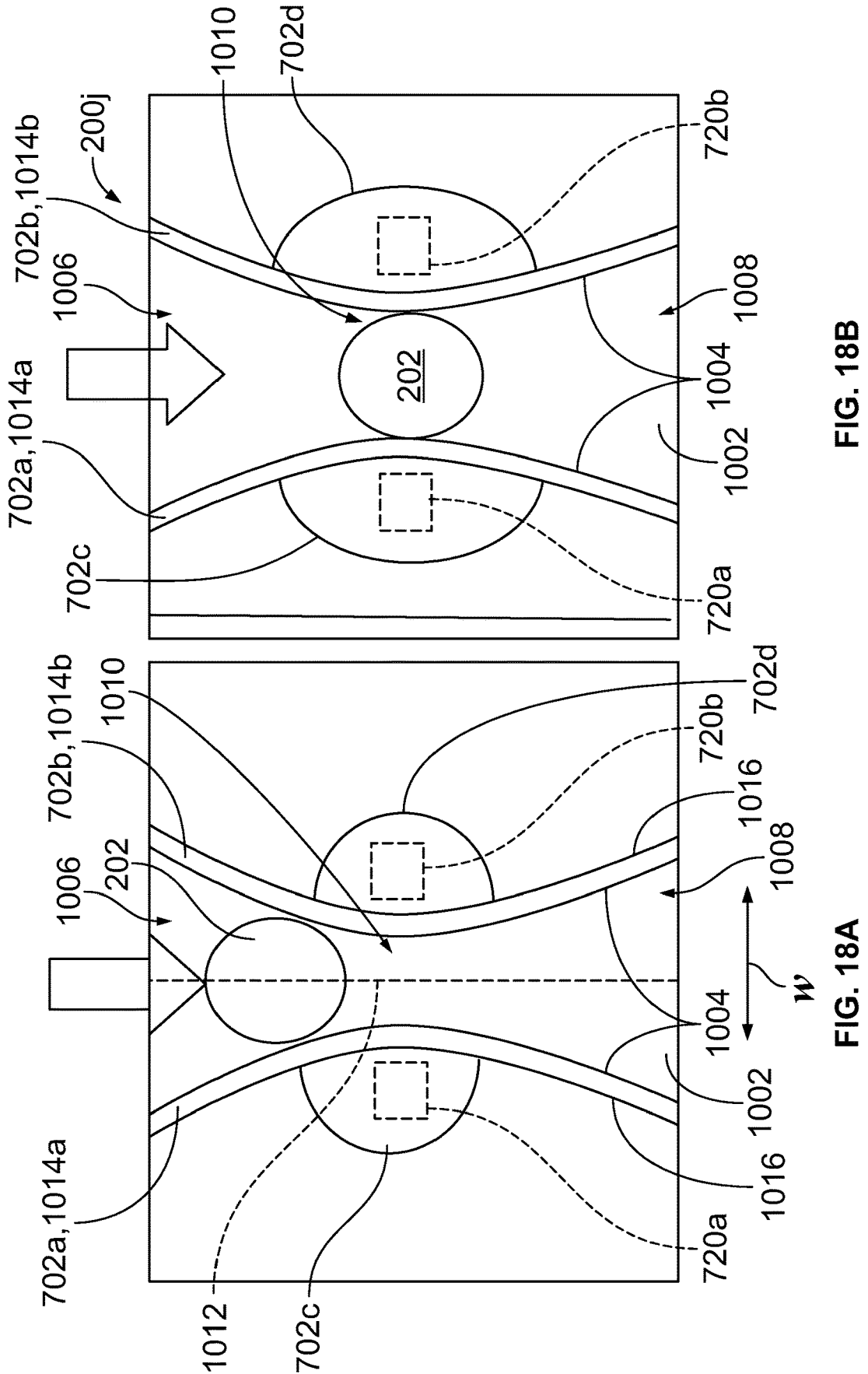
FIGS. 18A and 18B illustrate a schematic representation of a portion of an exemplary crop stabilizer and measurement system at a first, intake condition and a second, expanded condition, respectively.
Figures 19A, 19B:
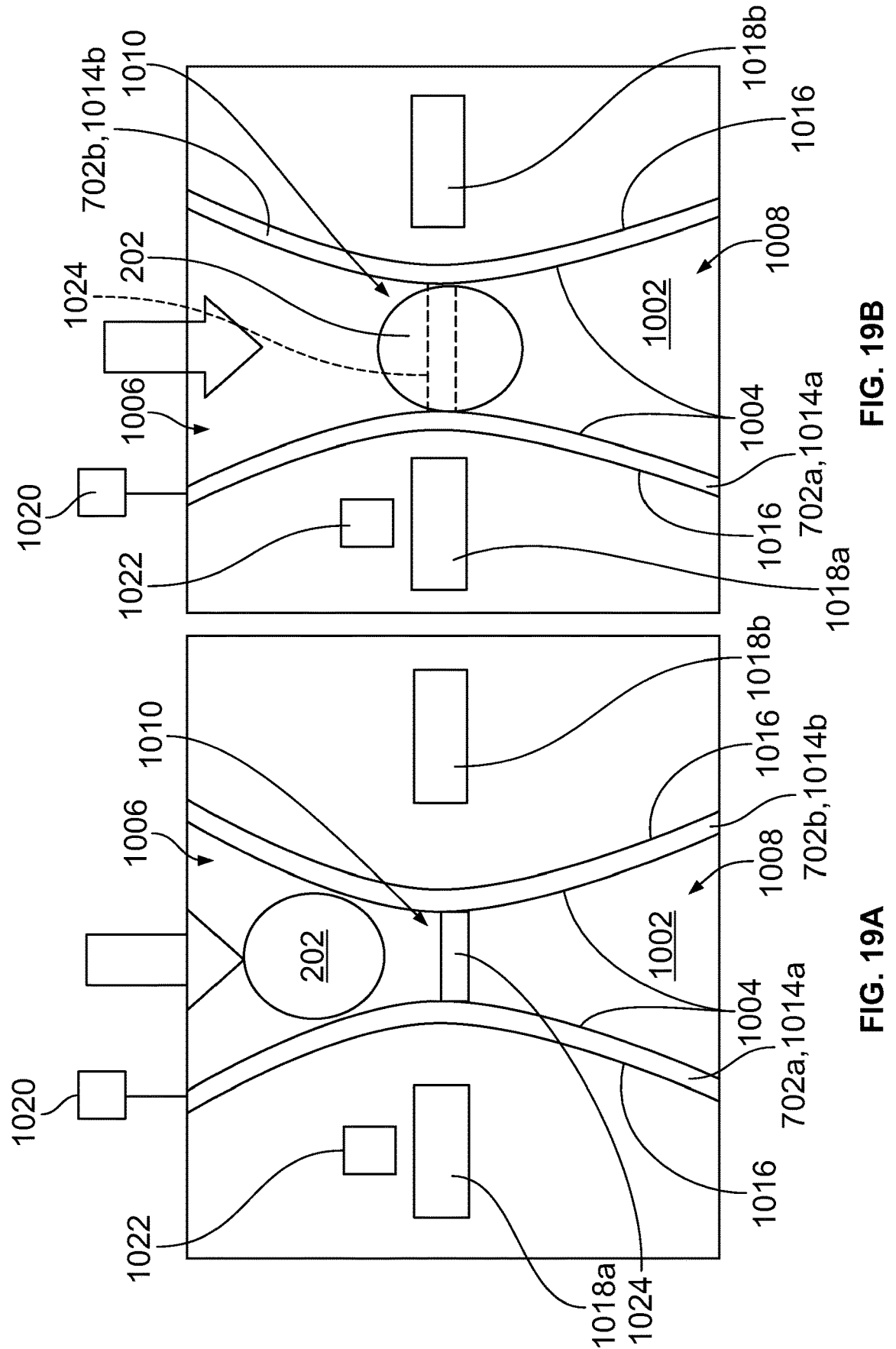
FIGS. 19A and 19B illustrate a schematic representation of a portion of an exemplary crop stabilizer and measurement system at a first, intake condition and a second, expanded condition, respectively.

FIGS. 18A and 18B illustrate a schematic representation of a portion of an exemplary crop stabilizer and measurement system 200j at a first, intake condition and a second, expanded condition, respectively. In the illustrated embodiment, the stabilizers 1014a, 1014b each have a deformation body 702a, 702b in the form of spring bodies or opposing spring walls that are positioned relative to each other to provide a passageway 1002 therebetween. Thus, each deformation body 702a, 702b of the stabilizers 1014a, 1014b can be constructed form a variety of metallic materials, including, for example, stainless steel, among others. Further, according to certain embodiments, the deformation body 702a, 702b can be configured to operate in a spring like manner, such as, for example, in a manner similar to a leaf spring. For example, according to the illustrated embodiment, the opposing inner sides 1004 of the deformation bodies 702a, 702b can be configured such that the passageway 1002 has an first end 1006, a second end 1008, and a neck region 1010 positioned between the first and second ends 1006, 1008. Referencing FIG. 18, the first and second ends 1006, 1008 can each have an initial width (in a direction generally indicated by "w" in FIG. 18A) between the opposing deformation bodies 702a, 702b or stabilizers 1014a, 1014b that, at least prior to engagement with a stalk 202, is at least larger than a corresponding width of the neck region 1010. Moreover, the neck region 1010 can provide the narrowest width of the passageway 1002 between the opposing deformation bodies 702a, 702b and/or stabilizers 1014a, 1014b. Further, the width of the passageway 1002 at the first end 1006 can provide a mouth to the passageway 1002 that can at least accommodate a degree of offset between the location at which the stalk 202 is entering the passageway 1002 and a centerline 1012 along the length of the passageway 1002. Further, as illustrated, the deformation bodies 702a, 702b or stabilizers 1014a, 1014b can be configured to provide a general transition between the differences in the widths of the first end 1006, neck region 1010, and second end 1008.

As the stalk 202 passes through the passageway 1002 and towards the neck region 1010, the stalk 202 can gradually come into contact with the deformation bodies 702a, 702b or stabilizers 1014a, 1014b, thereby resulting in a bending or deformation of the deformation bodies 702a, 702b. Accordingly, at or around the neck region 1010, and moreover, at the narrowest point of the neck region 1010, the deformation bodies 702a, 702b may attain largest expansion of the width of the neck region 1010, or largest deformation, deflection, or bending of the deformation bodies 702a, 702b. The extent of such expansion or deformation of the deformation bodies 702a, 702b can correspond to the size, such as, for example, cross-sectional size, of the stalk 202. Such expansion or deformation of the deformation bodies 702a, 702b can be sensed in a variety of manners.

For example, referencing FIGS. 18A and 18B, according to certain embodiments, one or both of the stabilizers 1014a, 1014b can further include another, or secondary deformation body 702c, 702d that can be mounted to the above-mentioned deformation bodies 702a, 702b, which can be referred to as primary deformation bodies 702a, 702b. For example, the secondary deformation bodies 702c, 702d can be coupled to a back side 1016 of the primary deformation bodies 702a, 702b. According to certain embodiments, the secondary deformation bodies 702c. 702d can be constructed from a deformation material different than the deformation material used for the primary deformation bodies 702a, 702b, including, for example, a material that is softer than the material used for the primary deformation bodies 702a, 702b. For example, the secondary deformation bodies 702c, 702d can be constructed from a memory shape foam or shape compliant gel, or a shape compliant assembly 722, as discussed for example, with respect to at least FIGS. 13A through 13D.

The deflection, deformation, or bending of the primary deformation bodies 702a, 702b can impart an imprint 810 on the associated secondary deformation bodies 702c, 702d. Such an imprint 810 can be detected by a sensor 720a, 720b in a manner similar to that discussed above with respect to at least FIGS. 14 and 15. Additionally, or alternatively, the sensor 720a, 720b can be an embedded sensor that is similar to the embedded sensor 720 discussed above with respect to at least FIG. 13C.

Alternatively, rather than utilizing secondary deformation bodies 702a, 702b, movement of the deformation bodies 702a, 702b in response to engagement with a stalk 202 can be either, or both, detected and measured by a sensor 1018a, 1018b that detects movement of the back side 1016 of the deformation bodies 702a, 702b. For example, referencing FIGS. 19A and 19B, according to certain embodiments, movement of the back side 1016 of one or more of the stabilizers 1014a, 1014b can be measured by a laser micrometer, among other sensors. Alternatively, or additionally, according to other embodiments, a power source 1020 can provide an electrical current that flows through one of the metallic deformation bodies 702a, 702b. According to such an embodiment, a sensor 1022 can be utilized to sense the corresponding magnetic field, and moreover, detect changes or drops in the magnetic field as the engagement of the deformation bodies 702a, 702b with the stalk 202 causes the deformation bodies 702a, 702b to move away from each other. Information regarding such changes in, or levels of, the magnetic field can be utilized by the controller 302 to determine a corresponding cross-sectional size of the stalk 202. Further, according to certain embodiments, a sensor 1024 in the form of a piezoelectric sensor can extend between the deformation bodies 702a, 702b that can convert, for example, a force or pressure exerted on the sensor 1024 in response to changes in size of the passageway 1002 associated with engagement of the deformation bodies 702a, 702b with the stalk 202, into an electric signal. Such an electric signal can then be correlated by the controller 302 to a corresponding cross-sectional size of the stalk 202.

Figure 20:
FIG. 20 illustrates a schematic representation of a portion of an exemplary crop stabilizer and measurement system.

FIG. 20 illustrates a schematic representation of a portion of another exemplary crop stabilizer and measurement system 200k. As seen, each of a pair of stabilizers 1214a, 1214b comprise a deformation body 702 that can be secured to a shaft 224. As the stalk 202 of the crop passes between the stabilizers 1214a, 1214b, the stalk 202 can engage the stabilizers 1214a, 1214b in a manner that can deform the deformation body 702, such as form an imprint 810 therein, so that the stalk 202 is able to pass between the stabilizers 1214a, 1214b. Such engagement with the stabilizers 1214a, 1214b can facilitate rotation of the stabilizers 1214a, 1214b in opposing directions, as generally indicated by "$r_7$" and "$r_8$" in FIG. 20.

The force exerted on the deformation bodies 702a, 702b of the stabilizers 1214a, 1214b can be utilized to determine the corresponding cross-sectional size of the stalk 202. For example, according to certain embodiments, one or more sensors 1202 in the form of a strain gauge can be positioned along an outer surface 1204 of, or embedded within, the deformation body 702 of one or both of the stabilizers 1214a, 1214b. Additionally, characteristics regarding the operation of at least the shafts 224 at least when the stabilizers 1214a, 1214b are engaged with the crop can be sensed or measured for correlation by the controller 302 with an associated cross-sectional size of the stalk 202. For example, according to certain embodiments, one or more sensors 1206 can be used to detect either, or both, a torque on the shafts 224 and the deflection of the shafts 224 that can occur when the stabilizers 1214a, 1214b are engaged with the stalk 202.

Figure 21:
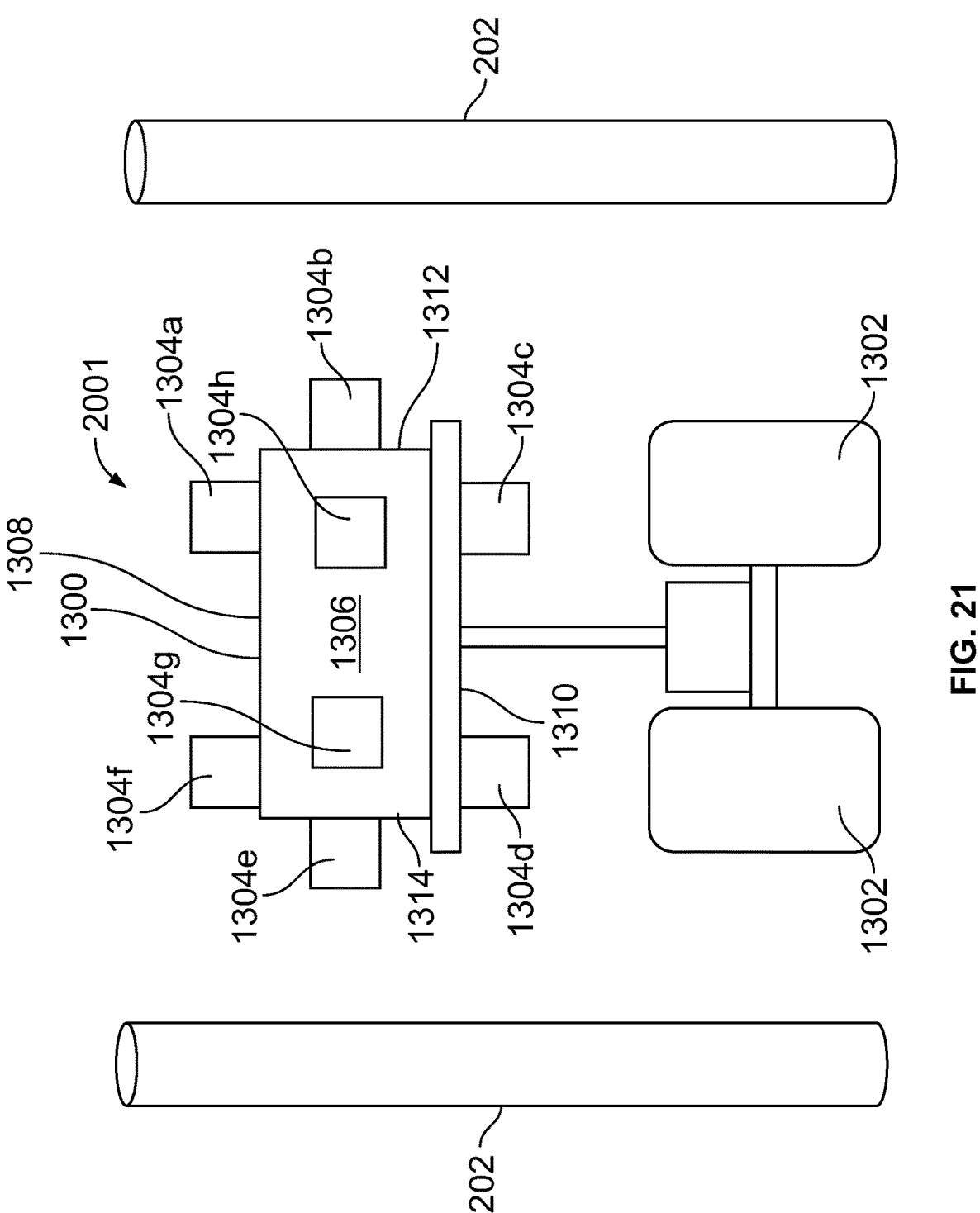
FIG. 21 illustrates a portion of an exemplary crop stabilizer and measurement system having at least one deployable autonomous vehicle positioned between a pair or rows of crop.

While the foregoing embodiments were discussed with respect to use with a harvester 100, the systems 200a through 200k discussed above can be utilized with a variety of other vehicles and machines, including, but not limited to, autonomous vehicles. For example, FIG. 21 illustrates a portion of an exemplary crop stabilizer and measurement system 200l having at least one deployable autonomous vehicle 1300 positioned between a pair or rows of crop, which is depicted as stalks 202. According to certain embodiments, the one or more autonomous vehicles 1300 can be mobile robots or driverless vehicles, including, but not limited to, self-driving vehicle and unmanned aerial vehicles, among others, that can travel along a terrain or in the air, as well as combinations thereof. Thus, FIG. 21 illustrates an autonomous vehicle 1300 in the form of a self-driven robot that traverses a field on a wheeled vehicle having one or more wheels 1302.

The autonomous vehicle 1300 can include a plurality of sensor systems 1304a through 1304h that can be positioned at a variety of locations on the vehicle 1300. For example, according to certain embodiments, one or more sensor systems 1304a through 1304h can be mounted to at least one of a front side 1306, rear side, top side 1308, bottom side 1310, right side 1312, left side 1314, or inside of the autonomous vehicle 1300, as well as combinations thereof, among other locations. The sensor systems 1304a through 1304h can include any one of the above-discussed systems 200a through 200k, as well as combinations thereof, among other sensor systems. Further, such sensor systems 200a through 200k can be part of the control system 300 shown in FIG. 4 and can provide information that is utilized by the controller 302 in connection with identifying characteristics or properties associated with the particular information provided by the sensor systems.

Additional sensor systems that can be utilized with the autonomous vehicle 1300, and which also can be part of the control system shown in FIG. 4, can, for example, include one or more optical sensor systems, such as, for example, a camera system. The optical system can be configured to obtain images or video, or both, that can be provided to the controller 302 for analysis of the crop material shown therein, including, but not limited to, cross-sectional size measurements, crop detection, and crop health monitoring. Additionally, or alternatively, the autonomous vehicle 1300 can include one or more sensor systems configured to detect at least one of soil characteristics, properties, and crop health.

The autonomous vehicle 1300, which may or may not be solar powered, can further include a location system, such as, for example, a global positioning system that can assist with guidance of the autonomous vehicle 1300, as well as provide an indication of a location at which information was obtained by the various sensor systems of the autonomous vehicle 1300. The location system can be part of the control system 300 shown in FIG. 4.

A plurality or network of autonomous vehicles 1300 can be utilized so as to increase the speed at which the task of sensing the either, or both, crop and soil properties is completed. Additionally, different autonomous vehicles 1300 can obtain measurements from different sides, portions, or perspective of the same crop plant, such as, for example, obtaining images that another autonomous vehicles 1300 may not be positioned to obtain. In such a situation, providing the controller 302 with information from either, or both, multiple autonomous vehicles 1300 and locations for the same crop plant can improve the accuracy of the resulting determination(s) or measurement(s) made by the controller 302.

The autonomous vehicle 1300 can also include communication interfaces that can allow wireless or wired communications, or both, by, or between, the autonomous vehicle 1300 and other autonomous vehicles 1300, as well as a central system or database, among other communications. Such information can provide information that can be stored, for example, in database or central system, for later be retrievable, such as, for example, by a harvester 100. For example, information obtained by a sensor system(s) 200a through 200k of one or more autonomous vehicle 1300 regarding stalk sizes, and the corresponding locations of the associated stalks, can be retrieved by a controller 302 of the harvester 100. Using such information, as well as knowledge of the current location of the harvester 100 relative to the measured stalk sizes, the controller 302 can decide if, and when, the size of the width of the gap 204 between the deck plates 208a, 208b is to be adjusted, and proceed with selectively actuating an actuator(s) to move at least one deck plate 208a, 208b to make such an adjustment. The communication interface(s) can, according to certain embodiments, also be part of the control system 300 shown in FIG. 4.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The invention claimed is:

1. A system for measuring a size of a crop, the system comprising:
   a first deck plate and a second deck plate;
   a first stabilizer adapted for at least one of a displacement and a deformation of the first stabilizer in response to an engagement of the first stabilizer with the crop, the first stabilizer being displaceable about more than one axis;
   at least one first sensor adapted to generate a first sensor signal in response to a detection by the at least one first sensor of the displacement or the deformation of the first stabilizer;
   a controller adapted to determine, using at least the first sensor signal, a measured size of the crop; and
   an actuator coupled to at least one of the first deck plate and the second deck plate, wherein the controller is adapted to selectively operate the actuator to adjust a width of a gap between the first and second deck plates to correspond to the measured size of the crop.

2. The system of claim 1, further including:
   a second stabilizer adapted for at least one of a displacement and a deformation of the second stabilizer in response to an engagement of the second stabilizer with the crop; and
   at least one second sensor adapted to generate a second sensor signal in response to a detection by the at least one second sensor of the displacement or the deformation of the second stabilizer,
   wherein the controller is adapted to determine the measured size using at least the first sensor signal and the second sensor signal.

3. The system of claim 2, wherein the first stabilizer and the second stabilizer are biased toward each other by one or more first biasing elements.

4. The system of claim 3, wherein the first and second stabilizers are biased by the one or more first biasing elements into contact with each other at least prior to the engagement of the first and second stabilizers with the crop.

5. The system of claim 2, further including a second biasing element coupled to the first stabilizer, the second biasing element configured to exert a biasing force to limit the degree the first stabilizer is rotatable during the engagement of the first stabilizer with the crop.

6. The system of claim 1, wherein the displacement detected by the at least one first sensor is either a displacement of a shaft about which the first stabilizer rotates or a deflection of the shaft.

7. The system of claim 1, wherein at least a portion of a sensor of the at least one first sensor is positioned within an interior region of a row divider of a harvester header.

8. The system of claim 7, wherein the sensor includes at least one capacitance plate positioned within the interior region of the row divider.

9. The system of claim 1, wherein the first stabilizer comprises a hinge portion and wherein the at least one first sensor is adapted to detect a rotation of the hinge portion of the first stabilizer.

10. The system of claim 1, wherein the first stabilizer comprises a deformation body that is structured to receive an imprint into the deformation body from the engagement with the crop, and wherein the at least one first sensor is adapted to detect at least one characteristic of the deformation body relating to the imprint.

11. The system of claim 10, wherein the at least one first sensor comprises a sensor that is embedded within the deformation body.

12. The system of claim 11, wherein the at least one first sensor comprises a strain gauge.

13. The system of claim 10, wherein the deformation body comprises a shape compliant assembly comprising a plurality of displaceable bodies and a frame, the plurality of displaceable bodies configured to be displaceable relative to the frame in response to the engagement with the crop.

14. The system of claim 10, wherein the deformation body comprises (a) a fluted portion of a stalk roll, (b) a brush, or (c) a pad.

15. A system for measuring a size of a crop, the system comprising:
   a first deck plate and a second deck plate;
   a first stabilizer adapted for at least one of a displacement and a deformation of the first stabilizer in response to an engagement of the first stabilizer with the crop;
   at least one first sensor adapted to generate a first sensor signal in response to a detection by the at least one first sensor of the displacement or the deformation of the first stabilizer;
   a controller adapted to determine, using at least the first sensor signal, a measured size of the crop; and
   an actuator coupled to at least one of the first deck plate and the second deck plate,
   wherein the controller is adapted to selectively operate the actuator to adjust a width of a gap between the first and second deck plates to correspond to the measured size of the crop, and
   wherein the at least one first sensor includes a sensor that detects a linear movement of the first stabilizer and another sensor that detects a rotational displacement of the first stabilizer.

16. A system for measuring a size of a crop, the system comprising:
   a first deck plate and a second deck plate;
   a first stabilizer adapted for at least one of a displacement and a deformation of the first stabilizer in response to an engagement of the first stabilizer with the crop;
   at least one first sensor adapted to generate a first sensor signal in response to a detection by the at least one first sensor of the displacement or the deformation of the first stabilizer;
   a controller adapted to determine, using at least the first sensor signal, a measured size of the crop; and
   an actuator coupled to at least one of the first deck plate and the second deck plate,
   wherein the controller is adapted to selectively operate the actuator to adjust a width of a gap between the first and second deck plates to correspond to the measured size of the crop,
   wherein at least a portion of a sensor of the at least one first sensor is positioned within an interior region of a row divider of a harvester header,
   wherein the sensor includes at least one capacitance plate positioned within the interior region of the row divider, and
   wherein at least a portion of another sensor of the least one first sensor is adapted to detect a position of at least a portion of the first stabilizer in an area outside of the row divider.

17. A system for measuring a size of a crop, the system comprising:

a first deck plate and a second deck plate;

a first stabilizer adapted for at least one of a displacement and a deformation of the first stabilizer in response to an engagement of the first stabilizer with the crop;

at least one first sensor adapted to generate a first sensor signal in response to a detection by the at least one first sensor of the displacement or the deformation of the first stabilizer;

a controller adapted to determine, using at least the first sensor signal, a measured size of the crop; and an actuator coupled to at least one of the first deck plate and the second deck plate, wherein the controller is adapted to selectively operate the actuator to adjust a width of a gap between the first and second deck plates to correspond to the measured size of the crop, wherein the first stabilizer comprises a deformation body that is structured to receive an imprint into the deformation body from the engagement with the crop, wherein the at least one first sensor is adapted to detect at least one characteristic of the deformation body relating to the imprint, wherein the deformation body comprises a primary deformation body and a secondary deformation body, the secondary deformation body comprising a material that is different than a material of the primary deformation body, and wherein the at least one first sensor comprises a sensor embedded in the secondary deformation body.

18. A method for measuring a size of a plant, the method comprising:

detecting at least one of a displacement and a deformation of each of a first stabilizer and a second stabilizer from an engagement of the first stabilizer and the second stabilizer with the plant;

determining, based on the detection of the displacement or the deformation, a measured size of the plant;

storing, in a memory operatively connected to a controller, a location information for the measured size of the plant for a plurality of plants;

analyzing the stored location information to detect a location-based variability in the measured size of the plant for the plurality of plants in one or more portions of the field; and adjusting, by operation of at least one actuator and based on the detected location-based variability, at least one of a first deck plate and a second deck plate to adjust a width of a gap between the first and second deck plates.

19. The method of claim 18, further including determining whether a difference between the measured size and an existing width of the gap satisfies a threshold value, and wherein displacing at least one of the first deck plate and the second deck plate further occurs in response to the determination that the threshold value is satisfied.

20. The method of claim 19, further including maintaining the existing width of the gap in response to the determination that the threshold value is not satisfied.

*     *     *     *     *